(12) United States Patent
Yungers et al.

(10) Patent No.: US 11,112,374 B2
(45) Date of Patent: Sep. 7, 2021

(54) VERIFYING STRUCTURAL INTEGRITY OF MATERIALS

(71) Applicant: 3M INNOVATIVE PROPERTIES COMPANY, St. Paul, MN (US)

(72) Inventors: Christopher R. Yungers, St. Paul, MN (US); Subhalakshmi M. Falknor, Woodbury, MN (US); David H. Redinger, Afton, MN (US); Ronald D. Jesme, Plymouth, MN (US); Eric M. Chinnock, Chanhassen, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 127 days.

(21) Appl. No.: 16/469,900

(22) PCT Filed: Dec. 15, 2017

(86) PCT No.: PCT/US2017/066596
§ 371 (c)(1),
(2) Date: Jun. 14, 2019

(87) PCT Pub. No.: WO2018/140148
PCT Pub. Date: Aug. 2, 2018

(65) Prior Publication Data
US 2019/0323980 A1    Oct. 24, 2019

Related U.S. Application Data

(60) Provisional application No. 62/435,418, filed on Dec. 16, 2016.

(51) Int. Cl.
*G01N 27/20*    (2006.01)
(52) U.S. Cl.
CPC .................................. *G01N 27/20* (2013.01)

(58) Field of Classification Search
CPC ...................................................... G01N 27/20
See application file for complete search history.

(56) References Cited

U.S. PATENT DOCUMENTS

| 4,764,970 A | 8/1988 | Hayashi et al. |
| 4,785,243 A | 11/1988 | Abramczyk et al. |

(Continued)

FOREIGN PATENT DOCUMENTS

| CN | 101832970 A | 9/2010 |
| CN | 205003121 U | 1/2016 |

(Continued)

OTHER PUBLICATIONS

Anatychuk, L.I., "Procedure and Equipment for Measuring Parameters of Thermoelectric Generator Modules", Journal of Electronic Materials, vol. 40, No. 5, 2011, pp. 1292-1297.

(Continued)

*Primary Examiner* — Paresh Patel
(74) *Attorney, Agent, or Firm* — Sriram Srinivasan; Thomas M. Spielbauer

(57) ABSTRACT

A method may include coupling a first electrical connector of an article to a second electrical connector of a measurement device. The article may include a tested material, the first electrical connector, and a plurality of electrical contacts electrically connected to the first electrical connector. The measurement device may include a power source and a user interface. The method also may include causing, by a controller, an electrical signal to be applied to a pair of drive electrical contacts from the plurality of electrical contacts. The method further may include receiving, by the controller, from an analog-to-digital converter, a measured voltage measured using a measurement electrical contact from the plurality of electrical contacts. The method also may include determining, by the controller, whether the tested material (Continued)

includes a crack or other defect based on the measured voltage.

18 Claims, 13 Drawing Sheets

(56) References Cited

U.S. PATENT DOCUMENTS

| | | | |
|---|---|---|---|
| 4,914,378 A | 4/1990 | Hayashi et al. | |
| 5,258,708 A | 11/1993 | Sadeghi et al. | |
| 5,409,394 A * | 4/1995 | Astier | H01R 13/6395 439/347 |
| 6,150,809 A | 11/2000 | Tiernan et al. | |
| 6,210,972 B1 | 4/2001 | Williams et al. | |
| 6,218,846 B1 | 4/2001 | Ludwig et al. | |
| 6,288,528 B1 | 9/2001 | Goodstein et al. | |
| 6,476,624 B1 | 11/2002 | Chuman et al. | |
| 6,922,641 B2 | 7/2005 | Batzinger et al. | |
| 7,161,356 B1 | 1/2007 | Chien | |
| 7,443,177 B1 | 10/2008 | Bowler | |
| 7,596,470 B2 | 9/2009 | Kim | |
| 7,705,589 B2 | 4/2010 | Kim et al. | |
| 8,327,306 B2 | 12/2012 | Oh et al. | |
| 8,552,752 B2 | 10/2013 | Qiu | |
| 8,624,401 B2 | 1/2014 | Ishikawa | |
| 8,816,705 B2 | 8/2014 | Espejord | |
| 9,037,430 B1 | 5/2015 | Wiggins et al. | |
| 2002/0024346 A1 | 2/2002 | Ikuta et al. | |
| 2003/0184321 A1 | 10/2003 | Hands | |
| 2004/0021461 A1 | 2/2004 | Goldfine et al. | |
| 2004/0241890 A1 | 12/2004 | Steele et al. | |
| 2005/0251062 A1 | 11/2005 | Choi et al. | |
| 2006/0283262 A1 | 12/2006 | Smits et al. | |
| 2008/0001608 A1 | 1/2008 | Saulnier et al. | |
| 2008/0191706 A1 | 8/2008 | Burnett et al. | |
| 2009/0121727 A1 | 5/2009 | Lynch et al. | |
| 2009/0192730 A1 | 7/2009 | Tada | |
| 2009/0202387 A1 | 8/2009 | Dlugos, Jr. et al. | |
| 2011/0023610 A1 * | 2/2011 | Ume | G01N 29/4481 73/622 |
| 2011/0060536 A1 | 3/2011 | Feng | |
| 2012/0013483 A1 | 1/2012 | Jung et al. | |
| 2012/0024346 A1 | 2/2012 | Bystrom et al. | |
| 2012/0153740 A1 | 6/2012 | Soar | |
| 2012/0177177 A1 | 7/2012 | Masters | |
| 2012/0235693 A1 | 9/2012 | Feng | |
| 2013/0307566 A1 | 11/2013 | Malone et al. | |
| 2014/0062521 A1 | 3/2014 | Yamada | |
| 2014/0152336 A1 | 6/2014 | Sasaki et al. | |
| 2014/0354307 A1 * | 12/2014 | Clarke | G01N 27/20 324/700 |
| 2015/0095000 A1 | 4/2015 | Patil et al. | |
| 2015/0204701 A1 | 7/2015 | Klicpera | |
| 2015/0308980 A1 | 10/2015 | Bittar et al. | |
| 2016/0163607 A1 | 6/2016 | Oh | |
| 2017/0167927 A1 | 6/2017 | Carkner | |
| 2018/0024042 A1 * | 1/2018 | Ulmer | G01N 17/006 324/700 |

FOREIGN PATENT DOCUMENTS

| | | |
|---|---|---|
| JP | S56-012544 | 2/1981 |
| JP | S62-047544 | 3/1987 |
| JP | H03-056848 A | 12/1991 |
| JP | H05-288706 A | 2/1993 |
| WO | WO 89/012833 A1 | 12/1989 |
| WO | WO 2007/075243 A1 | 7/2007 |

OTHER PUBLICATIONS

Aselage, T.L., et. al., "Large Enhancement of Boron Carbides' Seebeck Coefficients through Vibrational Softening" Physical Review Letters, vol. 81, No. 11, 1998, pp. 2316-2319.

Hartov, Alex, et al. "Using voltage sources as current drivers for electrical impedance tomography", Measurement Science and Technology, vol. 13, 2002, pp. 1425-1430.

International Search Report for PCT International Application No. PCT/US2017/066596, dated Aug. 9, 2018, 4 pages.

Lazarovitch, R., et al., "Experimental crack identification using electrical impedance tomography", NDT&E International, vol. 35, No. 5, pp. 301-316, Jul. 1, 2002.

Paraskevopoulous, I., "Solar Soldier: Virtual Reality Simulations and Guidelines for the Integration of Photovoltaic Technology on the Modern Infantry Soldier", School of Engineering and Design, Brunel University, U.K. 141-154.

Ruan, Tao, "Development of an Automated Impedance Tomography System and Its Implementation in Cementitious Materials", Clemson University—TigerPrints, All Dissertations Paper 1756, 2016, pp. 25-49.

Sauliner, Gary J., et al. "A high-precision voltage source for ETI", Physiological Measurement, Institute of Physics Publishing, Bristol, GB, vol. 27, No. 5, May 1, 2006, pp. S221-S236 (XP020105771).

Steinitz, Avital A. "Optimal Camera Placement." 2012 Thesis. (http://www.eecs.berkeley.edu/Pubs/TechRpts/2012/EECS-2012-69.pdf).

Valiant, Leslie G. "The Complexity of Enumeration and Reliability Problems," *SIAM Journal on Computing*, vol. 8, Issue 3, 1979, pp. 410-421.

Zaoui, Abdelhalim "Inverse Problem in Nondestructive Testing Using Arrayed Eddy Current Sensors", Sensors, 2010, vol. 10, p. 8696-8704.

\* cited by examiner

VERIFYING STRUCTURAL INTEGRITY OF MATERIALS

CROSS REFERENCE TO RELATED APPLICATIONS

This application is a national stage filing under 35 U.S.C. 371 of PCT/US2017/066596, filed Dec. 15, 2017, which claims the benefit of Provisional Application No. 62/435,418, filed Dec. 16, 2016, the disclosure of which is incorporated by reference in their entirety herein.

TECHNICAL FIELD

The disclosure relates to techniques for verifying structural integrity of materials.

BACKGROUND

Many materials are useful when their mechanical properties remain intact, but less useful when damaged, such as when cracked. Thus, detection of whether these materials are damaged is important. As one example, ceramic body plating is used to protect soldiers, police officers, and other security personnel from projectiles. Ceramic body plating may be useful when undamaged, but may be replaced after being damaged, e.g., after cracking.

X-ray scanning, including X-ray radiography and X-ray computed tomography (CT scanning) may be used to detect cracks or other defects in materials. However, such techniques may utilize large and heavy scanners, which may not be easily portable. Further, X-ray scanning and X-ray CT scanning may be relatively expensive, relatively slow, or both.

SUMMARY

In some examples, the disclosure describes an article that includes a tested material; a plurality of electrical contacts distributed about and electrically connected to the tested material; a programmable switch array electrically connected to the plurality of electrical contacts via a plurality of electrical connections; and a controller electrically coupled to the programmable switch array. The controller may be configured to cause an electrical signal to be applied to a pair of drive electrical contacts from the plurality of electrical contacts and cause a measured voltage to be determined using a pair of measurement electrical contacts. At least one measurement electrical contact of the pair of measurement electrical contacts is from the plurality of electrical contacts. The controller also may be configured to determine whether the tested material includes a crack or other defect based on the measured voltage.

In some examples, the disclosure describes a measurement system that includes an article and a measurement device. The article may include a tested material; a first electrical connector attached to the tested material; and a plurality of electrical contacts distributed about and electrically connected to the tested material and the first electrical connector. The measurement device may include a second electrical connector configured to be removably, electrically coupled to the first electrical connector and a power source electrically connected to the second electrical connector. At least one of the article or the measurement device may include a controller. The controller may be configured to cause an electrical signal to be applied to a pair of drive electrical contacts from the plurality of electrical contacts and cause a measured voltage to be determined using a pair of measurement electrical contacts. At least one measurement electrical contact of the pair of measurement electrical contacts is from the plurality of electrical contacts. The controller also may be configured to determine whether the tested material includes a crack or other defect based on the measured voltage.

In some examples, the disclosure describes a method that includes coupling a first electrical connector of an article to a second electrical connector of a measurement device. The article may include a tested material, the first electrical connector, and a plurality of electrical contacts electrically connected to the first electrical connector. The measurement device may include a power source. The method also may include causing, by a controller, an electrical signal to be applied to a pair of drive electrical contacts from the plurality of electrical contacts. The method further may include receiving, by the controller, from an analog-to-digital converter, a measured voltage measured using a pair of measurement electrical contacts, wherein at least one measurement electrical contact of the pair of measurement electrical contacts is from the plurality of electrical contacts. The method additionally may include determining, by the controller, whether the tested material includes a crack or other defect based on the measured voltage; and outputting, by the controller, to a user interface, an indication of whether the tested material includes the crack or other defect.

The techniques described herein may provide one or more advantages. For example, using a measurement system in which at least some electronics are physically attached to the material being tested may reduce failure points in the measurement system and may reduce complexity of connections between an external device of the measurement system and the material being tested. For example, a single digital connection may be used to connect an external device to the electronics physically attached to the material being tested, rather than multiple analog connections. As another example, in some implementations, all electronics or all electronics except a power source may be attached to the material being tested. This may allow quick testing of the material, which may be initiated simply by connecting the power source to the electronics. Further, a measurement system as described herein may offer improved portability and cost compared to an X-ray radiography or X-ray computed tomography system, while offering sufficient accuracy and detail to enable detection of cracks or other defects in a material being used in the field.

The details of one or more examples are set forth in the accompanying drawings and the description below. Other features, objects, and advantages will be apparent from the description and drawings, and from the claims.

DETAILED DESCRIPTION

Figure 1:
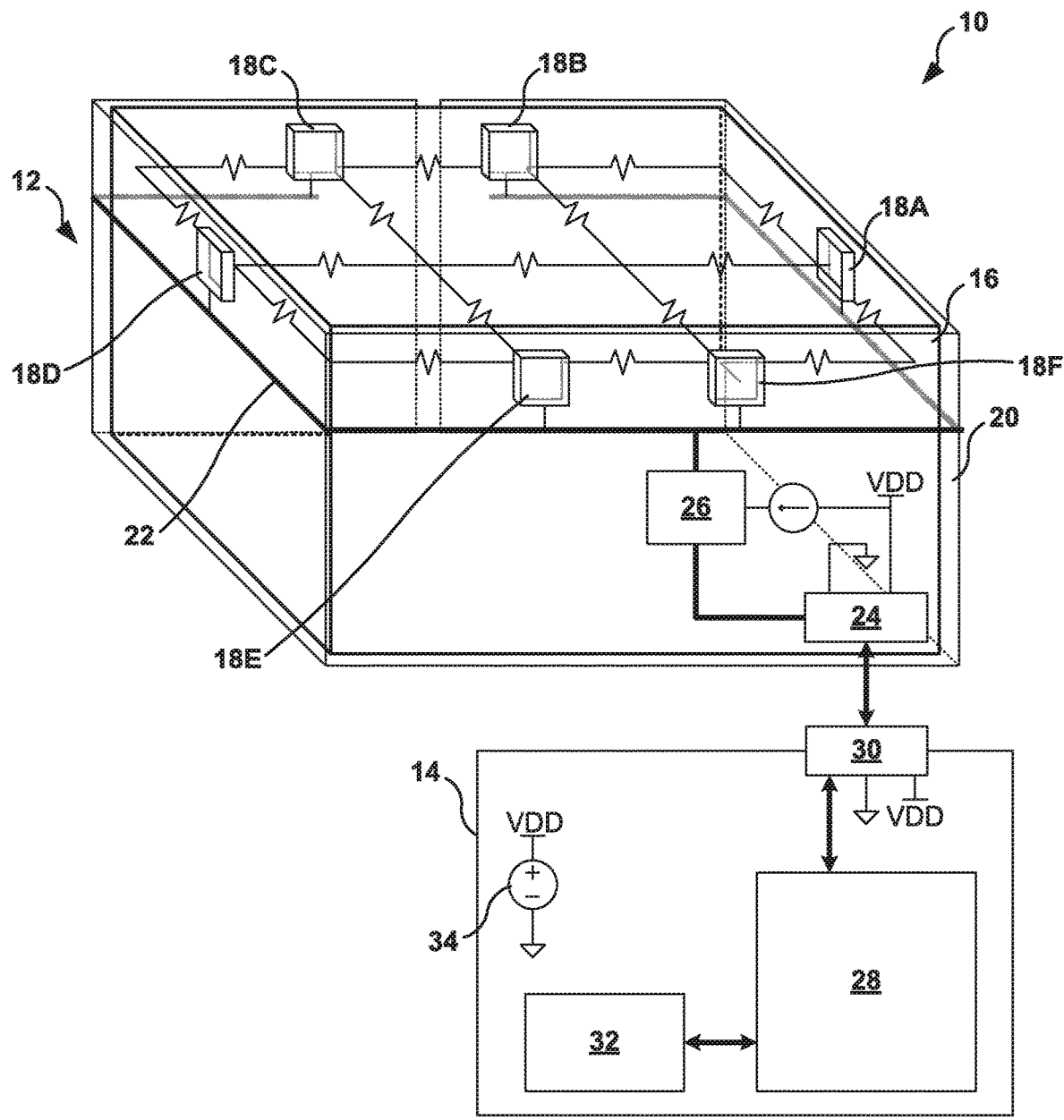
FIGS. 1-6 are a conceptual and schematic block diagrams illustrating example measurement systems for determining whether a tested material includes a crack or other defect.

The disclosure describes articles, measurement systems and techniques for verifying structural integrity of a tested material, in which at least some of the electronics of the measurement system are physically attached to the material being tested. The techniques may include determining whether the tested material includes a crack or other defect based on a comparison between at least a measured voltage associated with the material and a second voltage associated with the tested material. The second voltage may be another measured voltage or a control voltage.

In some examples, the measurement system may include an article and a measurement device. The article may include at least the tested material, a plurality of electrical contacts, and a first electrical connector. The measurement device may include at least a power source and a user interface. In some examples, the measurement system may include additional components, such as one or more of a programmable switch array, a data communication and control device, a controller, a non-volatile memory, an analog-to-digital converter. Each of the additional components may be part of the article or part of the measurement device. In this way, the article and the measurement device may each have a selected amount of functionality. By including more of the components in the article, the measurement device may be simpler and less costly and, in some examples, the testing procedure may be simpler. For example, the article may include all the electronics of the measurement system except a power source, or except a power source and a user interface device. Testing of the article may be initiated and completed simply by connecting a measurement device that includes a power source and a user interface device to the article, e.g., using an electrical connector. On the other hand, by including more of the components in the measurement, the article may be simpler and less costly.

In other examples, the measurement system may omit the measurement device, and all of the electronics may be part of the article. In such examples, the measurement technique may be performed simply, e.g., by activating a measurement switch, and reliability may be relatively high, as no connections with an external device are necessary.

Regardless of the configuration of the measurement system, a controller may cause a first measured voltage to be determined by causing an electrical signal to be applied to a pair of drive electrical contacts electrically coupled to the tested material and causing a measured voltage to be determined in response to the electrical signal using a measurement electrical contact electrically coupled to the tested material.

The controller may determine whether the tested material includes a crack or other defect based on the measured voltage. For example, the controller may utilize the measured voltage and a control voltage to determine whether the material includes a crack or other defect. The control voltage may be associated with the same measurement electrical contact and have been measured at a time at which it is independently known that the tested material is known to be intact (i.e., without a crack or other defect).

As another example, the controller may utilize the measured voltage and a second measured voltage associated with another measurement electrical contact. The positions of the contact between the first and second measurement electrical contacts and the tested material may be selected to allow meaningful comparisons between the first and second measured voltages. For example, electrical contacts may be positioned on the material based on a symmetry of the material, so that each measured voltage is substantially the same when the material is intact, or both.

Other techniques also may be used to detect cracks in a material. For example, X-ray radiography or X-ray computed tomography (CT) may be used to detect cracks in a material. However, X-ray radiography and X-ray CT utilize relatively large, relatively expensive equipment to perform the crack detection. This may prevent X-ray radiography and X-ray CT from being portable, such as being used to test materials in the environments in which they are used. Moreover, X-ray radiography and X-ray CT may be relatively time consuming. In contrast, the systems and techniques described herein utilize relatively smaller, relatively less expensive equipment.

FIG. 1 is conceptual and schematic diagram block illustrating an example measurement system 10 for determining whether a tested material 16 includes a crack or other defect. Measurement system 10 includes an article 12 and a measurement device 14. Article 12 may include tested material 16, a plurality of electrical contacts 18A-18F (collectively, "electrical contacts 18"), a substrate 20, a contact routing bus 22, a first electrical connector 24, and a programmable switch array 26. Measurement device 14 may include a controller 28, a second electrical connector 30, a user interface 32, and a voltage source 34.

Tested material 16 may be any material for which detection of a potential crack or other defect is desired. In some examples, tested material 16 may be an electrically conductive or an electrically semiconductive material. For example, tested material 16 may include a metal, an alloy, a metalloid, a semiconductor, an electrically conductive or semiconductive ceramic, or the like. In some examples, tested material 16 may include a ceramic such as boron carbide ($B_4C$), silicon carbide (SiC), alumina ($Al_2O_3$), composites thereof, or the like. In other examples, tested material 16 may include a dielectric material.

Tested material 16 may be used in any one of a wide variety of applications. For example, tested material 16 may be a ceramic that has relatively high hardness, a relatively high Young's modulus, a relatively high tensile strength, and may be used in ceramic armor plating. Ceramic armor plating may be used in body armor for military and police personnel, vehicle armor, or the like. Example materials for ceramic armor plating include boron carbide ($B_4C$), silicon carbide (SiC), alumina ($Al_2O_3$), composites thereof, or the like.

Tested material 16 may define any geometry, and the geometry of tested material 16 may be based at least in part on the intended use for tested material 16. For example, ceramic armor plating may have a geometry defined by the surface that the armor plating will be applied to. Example geometries for tested material 16 include, but are not limited to, polygonal solids, such as rectangular solids or solids with more sides.

In some examples, tested material 16 may define a geometry that has a symmetry, i.e., is symmetric. As used herein, a symmetry is a point, line, plane, curve, or manifold, with reference to which a single mathematical operation maps each point of tested material 16 to another point of tested material 16. As described in further detail below, in some examples in which tested material 16 includes a symmetry, controller 28 may compare voltages measured using electrical contacts 18 or pairs of electrical contacts 18 that are symmetrical with reference to the symmetry to determine whether tested material 16 includes a crack or other defect.

Article 12 also includes a plurality of electrical contacts 18. Plurality of electrical contacts 18 may include an electrically conductive material, such as, for example, an electrically conductive metal or alloy. Each of plurality of electrical contacts 18 may be electrically connected to tested material 16 using any suitable type of electrical coupling, including, for example, an electrically conductive adhesive, an electrically conductive solder, embedding electrical contacts 18 in tested material 16, a dielectric coupling via capacitive coupling, or the like.

In examples in which tested material 16 includes plurality of electrical contacts 18, each respective electrical contact may be positioned at a selected location of tested material 16. Electrical contacts 18 may be attached to any surface of tested material 16.

The surface to material electrical contacts 18 are attached may affect the direction in which the electrical field extends and current flows within tested material 16 (e.g., when selected sets of electrical contacts 18 are used as drive electrical contacts). Cracks or other defects may affect the magnitude of the voltage more significantly when the electrical field and current flow extends across a plane of the crack (e.g., normal to a surface of the crack). As such, in some examples, the likely locations of cracks or other defects and the likely orientation of cracks or other defects within tested material 16 may be predicted based on the use for tested material 16. In some of these examples, electrical contacts 18 may then be attached to tested material 16 so that the electrical field and current flow within tested material 16 extends substantially normal to a predicted orientation of the crack or other defect.

In some examples, rather than predicting a location of the crack or other defect within tested material 16 and placing electrical contacts 18 based on the prediction, electrical contacts 18 may be attached to more than one surface of tested material 16. For example, if tested material 16 is in the shape of a cube or polygonal solid, electrical contacts 18 may be attached to surfaces that define a selected perimeter of the cube or polygonal solid, as shown in FIG. 1. Other examples are possible for other shapes. In some examples, electrical contacts 18 are distributed across a surface area of tested material 16. In other examples, electrical contacts 18 are distributed around a perimeter of tested material 16, as shown in FIG. 1. In some examples, plurality of electrical contacts 18 may be referred to as a set of N electrical contacts 18.

In some examples, electrical contacts 18 may be positioned on tested material 16 according to a selected geometric relationship, to achieve a selected relationship between voltages determined using electrical contacts 18, or both. For example, electrical contacts 18 may be positioned on tested material 16 so that each electrical contact of electrical contacts 18 is substantially symmetric to another one of electrical contacts 18 with reference to the symmetry of tested material 16. In the example of FIG. 1, first electrical contact 18A is substantially symmetric to fourth electrical contact 18D with reference to a plane of symmetry of tested material 16, second electrical contact 18B is substantially symmetric to third electrical contact 18C with reference to the plane of symmetry, and fifth electrical contact 18E is substantially symmetric to sixth electrical contact 18F with reference to the plane of symmetry.

As another example, electrical contacts 18 may be positioned on tested material 16 so that a respective pair of electrical contacts is substantially symmetric to another respective pair of material electrical contacts 18 with reference to the symmetry of tested material 16. In some examples, electrical contacts 18 may be positioned on tested material 16 so that each respective pair of electrical contacts is substantially symmetric to another respective pair of electrical contacts 18 with reference to the symmetry of tested material 16. This may be accomplished in examples in which each electrical contact of material electrical contacts 18 is substantially symmetric to another one of electrical contacts 18 with reference to the symmetry of tested material 16, and a respective electrical contact of two symmetric material electrical contacts is used in each respective pair of electrical contacts in a symmetric pair of electrical contacts.

In some examples, two material electrical contacts may be positioned on the symmetry of tested material 16, e.g., on a plane of symmetry of tested material 16 shown in FIG. 1.

Positioning electrical contacts 18 to be exactly symmetrical may be difficult to achieve in practice. Hence, electrical contacts 18 may be positioned to be substantially symmetrical. As used here, substantially symmetrical means that the electrical contacts 18 are placed approximately symmetrical with reference to a symmetry of tested material 16, e.g., within about 0.5 mm of being symmetric, within about 0.2 mm of being symmetric, or within about 0.1 mm of being symmetric.

In some examples, rather than electrical contacts 18 being positioned based on symmetry of tested material 16, electrical contacts 18 may be positioned to achieve a selected relationship between voltages determined using electrical contacts 18. For example, electrical contacts 18 may be positioned to achieve measurement of a substantially similar voltage (e.g., the same or nearly the same voltage) in the absence of a crack or other defect. In some examples, this may include positioning respective groups of electrical contacts 18 to achieve measurement of a substantially similar voltage (e.g., the same or nearly the same voltage) in the absence of a crack or other defect. Each respective group of electrical contacts 18 may include a pair of drive electrical contacts and one or two measurement electrical contacts. For example, a group of electrical contacts 18 may include a pair of drive electrical contacts separated by one or two measurement electrical contacts. Using electrical contacts 18 shown in FIG. 1, an example of this configuration may include a pair of drive electrical contacts that includes first electrical contact 18A and fourth electrical contact 18D, and a pair of measurement electrical contacts that includes second electrical contact 18B and material electrical contact 18C. Another example of this configuration may include a pair of drive electrical contacts that includes first electrical contact 18A and third electrical contact 18C, and a measurement electrical contact that includes second electrical contact 18B (to measure a single-ended voltage using second electrical contact 18B and a reference electrode (not shown in FIG. 1)).

In some examples, positioning electrical contacts 18 so that the voltage measured using each respective group of electrical contacts 18 is exactly the same as the voltage measured using each other respective group of electrical contacts 18 may be difficult to achieve in practice. Hence, electrical contacts 18 may be positioned to be so that the voltage measured using each respective group of electrical contacts 18 is substantially the same as the voltage measured using each other respective group of electrical contacts 18. As used herein, substantially the same means that the electrical contacts are placed so that the voltage measured using each respective group of electrical contacts is within a threshold amount as the voltage measured using each other respective group of electrical contacts in the absence of a crack or defect in tested material 16. The threshold amount may be a predetermined percentage of the measured voltage, such as, for example, 20%, 10%, 5%, or 1%.

In some examples, electrical contacts 18 may be positioned on tested material 16 to satisfy both symmetry and substantially equal measured voltages.

Article 12 also may optionally include a substrate 20. Substrate 20 may include a flex circuit, a printed circuit board (PCB), or the like, to which electronic and electrical components may be mounted and electrically connected. For example, substrate 20 may include an electrically insulating material that provides mechanical support for substrate 20 and a plurality of electrically conductive traces that electrically connect components mounted or connected to substrate 20. The electrically insulating material may include, for example, a polymer, ceramic, or other dielectric material. For instance a flex circuit may include a flexible plastic, such as a polyimide a polyester, a polyether ether ketone (PEEK), or the like. A PCB may include, for example, a glass epoxy, a phenolic material, a polyimide, a polyester, or the like. In some examples, the PCB may include a reinforcement material, such as paper, fiberglass, or the like, impregnated or coated with a glass epoxy, a phenolic material, a polyimide, a polyester, or the like. The conductive traces in the PCB or flex circuit may include, for example, copper, silver, aluminum, or the like.

Article 12 further may include first electrical connector 24. First electrical connector 24 provides electrical connection between article 12 and measurement device 14, e.g., via connection to second electrical connector 30. As such, first electrical connector 24 and second electrical connector 30 may conform to the same connector configuration and have complementary electrical and mechanical connections. First electrical connector 24 may be physically mounted to substrate 20 and electrically connected to one or more electrically conductive traces in or on substrate 20. In some examples, first electrical connector 24 is configured to support digital signals for communication between article 12 and measurement device 14.

Article 12 additionally may optionally include a programmable switch array 26. Programmable switch array 26 includes a plurality of inputs and a plurality of outputs, with respective inputs electrically coupled to each respective output by a network of programmable switches. For example, programmable switch array 26 may include inputs electrically connected to contact routing bus 22, and outputs electrically connected to first electrical connector 24. In some examples, programmable switch array 26 may include at least as many inputs as there are electrical contacts 18. For example, in the example shown in FIG. 1, article 12 includes six electrical contacts 18, and programmable switch array 26 thus may include at least six inputs.

In some examples, rather than including a single programmable switch array 26 may include multiple programmable switch arrays, such as a first programmable switch array connected to a voltage or current source, a second programmable switch array connected to a return or ground, a third programmable switch array connected to a first input of controller 28 or an analog-to-digital converter (not included in FIG. 1), and a fourth programmable switch array connected to a second input of controller 28 or an analog-to-digital converter (not included in FIG. 1).

Article also may include a contact routing bus 22, which electrically connects respective electrical contacts of electrical contacts 18 to programmable switch array 26. Contact routing bus 22 may be formed by electrical traces on or in substrate 20.

Measurement device 14 may include second electrical connector 30. Second electrical connector 30 provides electrical connection between article 12 and measurement device 14, e.g., via connection to first electrical connector 24. As such, first electrical connector 24 and second electrical connector 30 may conform to the same connector configuration and have complementary electrical and mechanical connections. Second electrical connector 30 may be physically mounted to a substrate (e.g., a PCB) and electrically connected to one or more electrically conductive traces in or on the substrate. In some examples, second electrical connector 30 is configured to support digital signals for communication between article 12 and measurement device 14.

Measurement device 14 also includes a voltage source 34. Voltage source 34 may provide electrical power for operation of measurement system 10, e.g., for operation of controller 28 and the electrical signal applied to a pair of drive electrical contacts from electrical contacts 18 during testing. Voltage source 34 may include any device configured to output an electrical signal. The electrical signal may include an alternating current (AC) signal or a direct current (DC) signal. In some examples, voltage source 34 may include a power source, such as a battery, a capacitor, a supercapacitor, a transformer electrically connected to a mains voltage, or the like. In some examples, in addition to the power source, voltage source 34 may include analog or digital circuitry configured to receive the electrical signal from the power source and modify the electrical signal into a format suitable for output to components of measurement system 10.

Measurement device 14 further includes a user interface (UI) device 32. UI device 32 may include an output device, and input device, or both. Input devices may include, for example, buttons, switches, a touchscreen, or the like. Output devices may include, for example, a light or light emitting diode (LED), a display, a speaker, a haptic device, or another device configured to output visible, audible, tactile, or perceivable information.

Measurement device 14 also may include a controller 28. Controller 28 is configured to control operation of measurement system 10, including UI device 32 and programmable switch array 26. Controller 28 may include, for example, a processor. The processor may include one or more microprocessors, digital signal processors (DSP), application specific integrated circuits (ASIC), field programmable gate arrays (FPGA), or other digital logic circuitry. In some examples, controller 28 may include an analog-to-digital converter (ADC), or measurement system 10 may include an ADC separate from controller 28 (e.g., as shown in FIGS. 3-7). The ADC may measure the voltage using the selected measurement electrical contact, e.g., under control of controller 28.

Controller 28 is electrically coupled to UI device 32 and programmable switch array 26 either directly or indirectly via electrical connectors 24 and 30. Controller 28 may be configured to control programmable switch array 26 to electrically connect selected electrical contacts of electrical contacts 18 to serve as a pair of drive electrical contacts, such that the electrical signal is output to the pair of drive electrical contacts.

Controller 28 is also configured to cause programmable switch array 26 to connect a selected pair of electrical contacts 18 or one of electrical contacts 18 and a reference electrode to controller 28 to serve as a pair of measurement electrical contacts. In this way, controller 28 may determine a voltage across a pair of measurement electrical contacts in response to the electrical signal output to the pair of drive electrical contacts.

In some examples, measurement system 10 may optionally include a reference electrode, which may not be electrically coupled to tested material 16 and may be used for single-ended voltage measurements between one electrical contact of plurality of electrical contacts 18 and the reference electrode. The reference electrode may be at a selected voltage, such a ground or an offset voltage. In some examples, controller 28 may use the single-ended voltages in the techniques described herein to determine whether tested material 16 includes a crack or other defect. In other examples, controller 28 may determine differential voltages between two electrical contacts electrically coupled to tested material 16 by comparing (e.g., subtracting) single ended voltages associated with the two electrical contacts, and controller 28 may use these differential voltages in the techniques described herein to determine whether material 16 includes a crack or other defect. In still other examples, controller 28 may determine a voltage between two of electrical contacts 18 directly, e.g., without first determining two single-ended voltages.

To determine one or more voltages to be used to determine whether tested material 16 includes a crack or other defect, controller 28 is configured to cause programmable switch array 26 to connect a pair of electrical contacts from electrical contacts 18 to voltage source 34 to act as a set of drive electrical contacts. Controller 28 may cause voltage source 34 to output the electrical signal to the set of drive electrical contacts. As electrical contacts 18 are electrically coupled to tested material 16, the output electrical signal may pass through the set of drive electrical contacts and through tested material 16.

Controller 28 may be configured to also cause programmable switch array 26 to connect controller 28 to two of electrical contacts 18 or one of electrical contacts 18 and a reference electrode as measurement electrical contacts, and may determine a measured voltage in response to the electrical signal applied to the set of drive electrical contacts using the measurement electrical contacts. For example, in some implementations, controller 28 may cause the measurement electrical contacts to be electrically connected to an analog-to-digital converter, which may be used to determine the measured voltage. As electrical contacts 18 are electrically coupled to tested material 16, electrical contacts 18 may be used to determine a voltage in tested material 16.

In some examples, controller 28 may be configured to cause switch network to sequentially connect respective measurement electrical contacts (each including either two of electrical contacts 18 or one of electrical contacts 18 and a reference electrode as measurement electrical contacts), and controller 28 may determine a respective measured voltage in response to the electrical signal using each of the respective measurement electrical contacts. Controller 28 may repeat this process of causing an electrical signal to be applied to a set of drive electrical contacts and determining at least one respective measured voltage for any selected number of measurement electrical contacts for each set of drive electrical contacts, and for any selected number of drive electrical contacts.

Once controller 28 has determined or received at least one measured voltage associated with a respective measurement electrical contact, controller 28 may utilize the measured voltage in combination with a control voltage, another measured voltage associated with another measurement electrical contact from electrical contacts 18, or both to determine whether tested material 16 includes a crack or other defect. A control voltage may represent the voltage measured for a give combination of pair of drive electrical contacts and measurement electrical contact when tested material 16 does not include a crack or other defect. The control voltage may be based on tested material 16, a model, or an average of a plurality of materials that are similar to or substantially the same as tested material 16. For example, controller 28 may determine the control voltage at a time at which tested material 16 is manufactured, or a time at which an independent measurement (e.g., X-ray radiology or X-ray CT scan) may be used to verify that tested material 16 is intact, undamaged, or does not include a crack. Controller 28 may determine a control voltage by causing an electrical signal to be applied to a pair of drive electrical contacts from electrical contacts 18 and determining the measured voltage using a measurement electrical contact. In some examples, the control voltages may be determined using similar or substantially the same combinations of pairs of drive electrical contacts and measurement electrical contacts as are used to determine the measured voltages described above.

In other examples, the control voltage may be determined using a model of the material in an intact (undamaged) state. For example, controller 28 or another computing device may execute the model of tested material 16 and determine the control voltage based on the model. In some examples, the model may include a physics-based model of the electrical properties of tested material 16. In some other examples, the control voltage may be determined as an average (e.g., mean) of a plurality of similar materials (e.g., in geometry and composition) that are known to be intact (undamaged). This control voltage may be stored (e.g., in a memory device associated with controller 28, a memory device that is part of article 12, or the like) for later use.

Controller 28 may utilize the control voltage and the measured voltage to determine whether tested material 16 includes a crack or other defect. For example, controller 28 may determine a difference or ratio between a magnitude of the measured voltage associated with a measurement electrical contact of electrical contacts 18 and a magnitude of the control voltage associated with the same measurement electrical contact. Controller 28 then may compare this difference or ratio to a threshold voltage value or threshold ratio, and may determine that tested material 16 includes a crack or other defect in response to the difference being greater than the threshold voltage value or threshold ratio.

In some examples, rather than utilizing control voltages, controller 28 may utilize two or more voltages measured using tested material 16 and a predetermined relationship between the voltages to determine whether tested material 16 includes a crack or other defect. In some examples, the geometrical configuration of the set of drive electrical contacts, a first measurement electrical contact, and a second measurement electrical contact may be selected to allow meaningful comparisons between a first measured voltage determined using the first measurement electrical contact and a second measured voltage determined by the second measurement electrical contact. For example, the set of drive electrical contacts may be positioned on the symmetry of tested material 16, e.g., on a plane of symmetry of tested material 26. The first measurement electrical contact and second measurement electrical contact may be positioned symmetrically with reference to the symmetry of tested material 16, e.g., with reference to the plane of symmetry of tested material 16. In such an example, the first measured voltage and the second measured voltage are expected to be substantially the same (e.g., the same or nearly the same) in the absence of a crack or other defect in tested material 16. For example, in the absence of a crack or defect in tested material 16, the first voltage and the second voltage may be within a predetermined percentage of each other, such as, for example, within about 20%, 10%, 5%, or 1% of each other. Any difference between the first and second measured voltages that is greater than a threshold difference may indicate that tested material 16 includes a crack or other defect.

As another example, a first pair of drive electrical contacts and a second pair of drive electrical contacts may be the different than each other. The first pair of drive electrical contacts and a first measurement electrical contact are a first group of electrical contacts and a second pair of drive electrical contacts and the second measurement electrical contact are a second group of electrical contacts. The first and second group of electrical contacts may be symmetric with each other relative to the symmetry of tested material 16, e.g., a plane of symmetry. As such, in the absence of a crack or other defect in tested material 16 the first measured voltage and the second measured voltage are expected be substantially the same (e.g., the same or nearly the same). Any difference between the first and second measured voltages that is greater than a threshold difference may indicate that tested material 16 includes a crack or other defect.

As a further example, electrical contacts 18 may be positioned so that, for each group that includes a pair of drive electrical contacts and a measurement electrical contact, the measured voltage in the absence of a crack or other defect is substantially the same. The respective groups of electrical contacts may or may not be symmetric to another group of electrical contacts, and tested material 16 may or may not include a symmetry. As such, regardless of the groups of electrical contacts selected as the first group of electrical contacts and the second group of electrical contacts, in the absence of a crack or other defect in material 16 the first measured voltage and the second measured voltage may be substantially the same (e.g., the same or nearly the same). Any difference between measured voltages that is greater than a threshold difference may indicate that tested material 16 includes a crack or other defect.

In this way, measurement system 10 may utilize article 12 and measurement device 14 to determine whether tested material 16 includes a crack or other defect. By including some of the components of measurement system 10 in article 12, connection between article 12 and measurement device 12 through connectors 24 and 30 may be simpler, e.g., may include fewer electrical connections, and thus, may be more robust and reliable, than if all components are separate from article 12. In some examples, the connection through connectors 24 and 30 may be a digital connection. On the other hand by including some of the components of measurement system 10 in measurement device 14, a cost and complexity of article 12 may be less than if all components of measurement device 14 are included in article 12.

Figure 2:
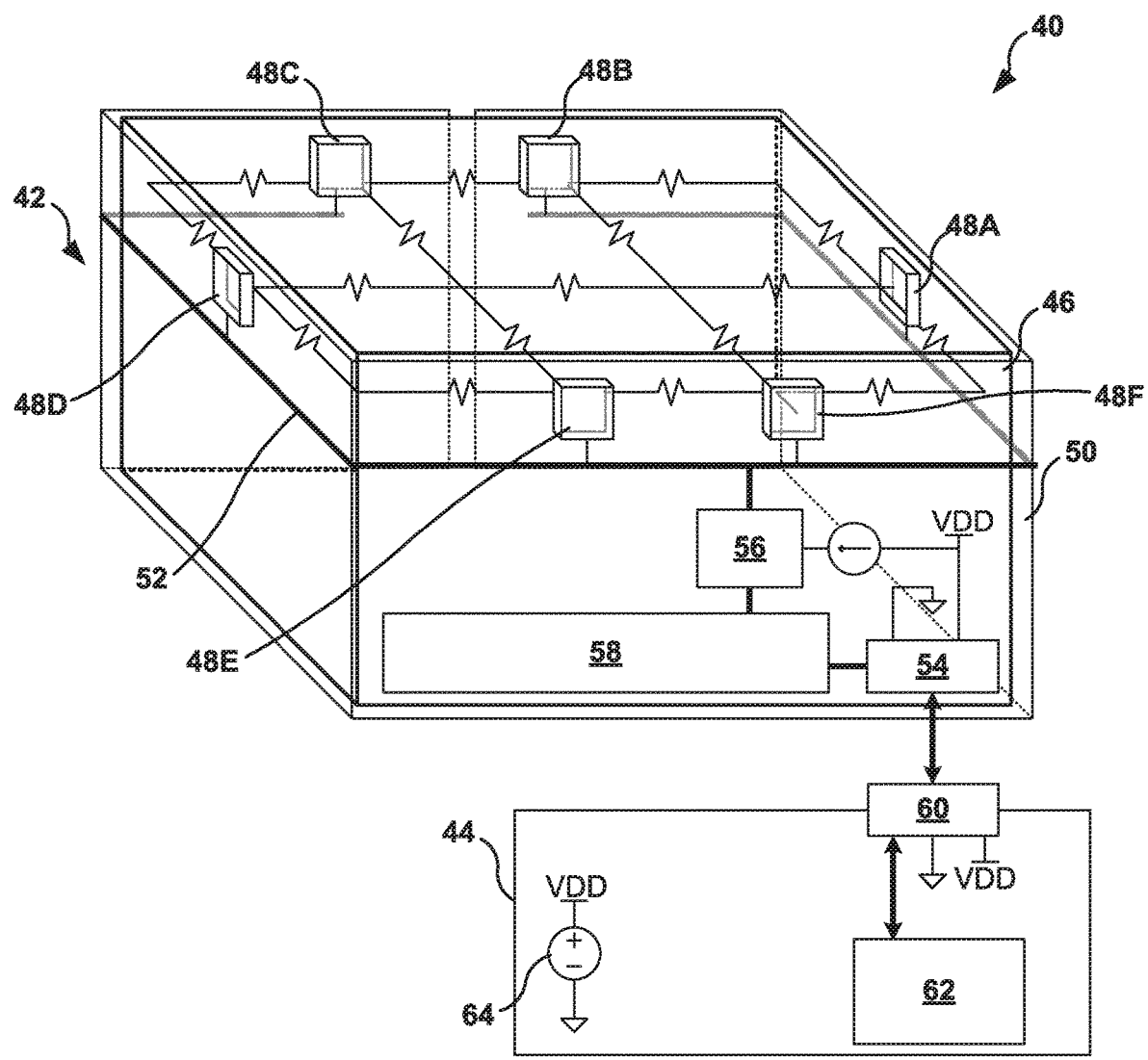

As described above, components of a measurement system may be distributed between article 12 and measurement device 14 in various option. FIG. 2 is a conceptual and schematic block diagram illustrating another example measurement system 40 for determining whether a tested material 46 includes a crack or other defect. In many respects measurement system 40 is similar to measurement system 10 of FIG. 1. For example, measurement system 40 includes an article 42 and a measurement device 44. Article 42 may be similar to article 12 of FIG. 1 and measurement device 44 may be similar to measurement device 14 of FIG. 1, aside from the differences described herein.

Similar to article 12 of FIG. 1, article 42 includes tested material 46, a plurality of electrical contacts 48, a substrate 50, a contact routing bus 52, a first electrical connector 54, and a programmable switch array 56. Each of these components may be similar to or substantially the same as the corresponding components described with reference to FIG. 1.

Similar to measurement device 14 of FIG. 1, measurement device 44 of FIG. 2 includes a second electrical connector 60, a user interface device 62, and a voltage source 64. Each of these components may be similar to or substantially the same as the corresponding components described with reference to FIG. 1.

Unlike measurement system 10 of FIG. 1, in measurement system 40, article 42 includes a controller 58, and measurement device 44 omits a controller. Controller 58 is electrically connected between first electrical connector 54 and programmable switch array 56, and may be electrically connected to first electrical connector 54 and programmable switch array 56 using conductive traces on or in substrate 50. Aside from the inclusion of controller 58 in article 42 rather than measurement device 44, controller 58 may be functionally similar to or substantially the same as controller 28 of FIG. 1.

In some examples, measurement system 40 may simplify testing of tested material 46. For example, connecting first electrical connector 54 and second electrical connector 60 may cause controller 58 to initiate the testing procedure, e.g., without further inputs from a user. Connecting first electrical connector 54 and second electrical connector 60 may result in power being provided by voltage source 64 to article 42, including controller 58. Upon receiving power, controller 58 may initiate one or more of the testing procedures described herein. In some examples, upon determining whether tested material 46 includes a crack or other defect, controller 58 may output an indication of the determination to user interface device 62, e.g., via first electrical connector 54 and second electrical connector 60. User interface device 62 may output the indication, e.g., as a visible, audible, or tactile output communicating information regarding whether tested material 46 includes a crack or other defect.

Figure 3:
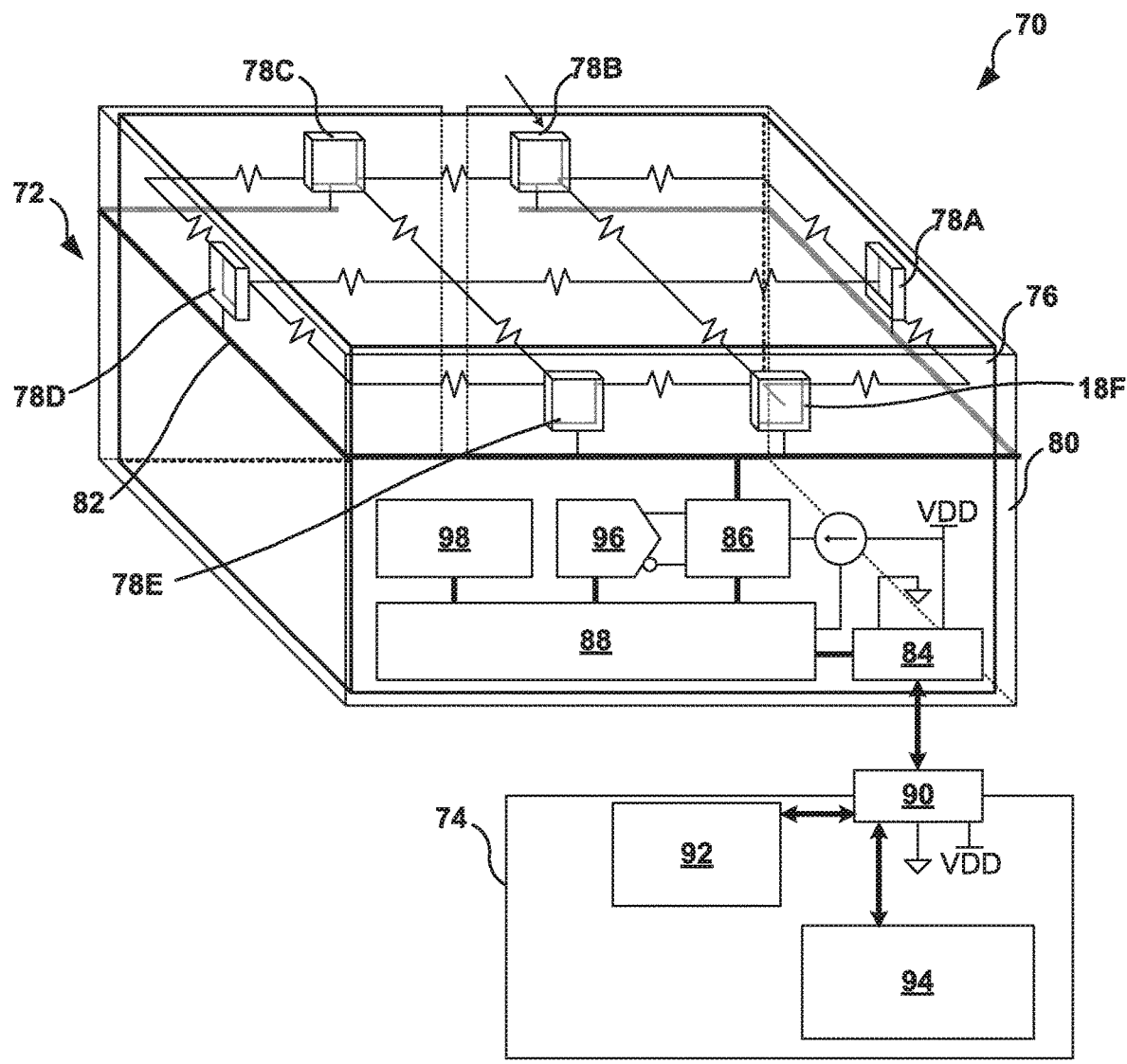

In some examples, a measurement system may include one or more additional components that may facilitate the measurement techniques described herein. For example, FIG. 3 is a conceptual and schematic block diagram illustrating another example measurement system 70 for determining whether a tested material 76 includes a crack or other defect. In many respects measurement system 70 is similar to measurement system 10 of FIG. 1. For example, measurement system 70 includes an article 72 and a measurement device 74. Aside from the differences described herein, article 72 may be similar to article 12 of FIG. 1 and measurement device 74 may be similar to measurement device 14 of FIG. 1.

Similar to article 12 of FIG. 1, article 72 includes tested material 76, a plurality of electrical contacts 78, a substrate 80, a contact routing bus 82, a first electrical connector 84, and a programmable switch array 86. Each of these components may be similar to or substantially the same as the corresponding components described with reference to FIG. 1.

Similar to measurement device 14 of FIG. 1, measurement device 74 of FIG. 3 includes a second electrical connector 90, a user interface device 92, and a voltage source 94. Each of these components may be similar to or substantially the same as the corresponding components described with reference to FIG. 1. In other examples, measurement device 74 may include voltage source 94 and, optionally, second electrical connector 90, and may omit user interface device 92.

Unlike measurement system 10 of FIG. 1, in measurement system 70, article 72 also includes a controller 88, an analog-to-digital converter (ADC) 96, and a non-volatile memory (NVM) 98. Controller 88 may be functionally similar to controller 28 of FIG. 1, aside from the differences described herein. In some examples, article 72 additionally may include user interface device 92 (e.g., in examples in which measurement device omits user interface device 92).

Article 72 includes ADC 96, which may be attached to substrate 80 and electrically connected to programmable switch array 86 and controller 88 using electrical traces in or on substrate 80. ADC 96 may include at least a control input electrically connected to controller 88, which allows controller 88 to control operation of ADC 96 and read data from ADC 96, and at least two signal inputs electrically connected to programmable switch array 86. ADC 96 may be a differential ADC, which accepts two input signals and digitizes the voltage difference between the two input signals.

Controller 88 may be configured to cause programmable switch array 86 to connect a selected pair of electrical contacts 78 or one of electrical contacts 78 and a reference electrode to ADC 96 to serve as a pair of measurement electrical contacts. For example, controller 88 may cause programmable switch array 86 to connect a first electrical contact of electrical contacts 78 to a first input of ADC 96 (e.g., a positive input) and connect a second electrical contact of electrical contacts 78 or a reference electrode to a second input of ADC 96 (e.g., a negative input). In this way, ADC 96 may determine a measured voltage across a pair of measurement electrical contacts in response to an electrical signal output to a pair of drive electrical contacts. In order to determine a respective voltage for each of a plurality of measurement electrical contacts, controller 88 may cause programmable switch array 86 to connect a first pair of measurement electrical contacts to ADC 96, cause ADC 96 to measure a first measured voltage using the first pair of measurement electrical contacts, cause programmable switch array 86 to connect a second pair of measurement electrical contacts to ADC 96, cause ADC 96 to measure a second measured voltage using the second pair of measurement electrical contacts, and so on.

Controller 88 may retrieve the measured voltage determined by ADC 96 and determine whether tested material 76 includes a crack or other defect based on the measured voltage. In some examples, as described above, controller 88 also may utilize a control voltage along with the measured voltage to determine whether tested material 76 includes a crack or other defect. In some examples, NVM 98 may store the control voltage, and controller 88 may retrieve the control voltage from NVM 98.

NVM 98 may be attached to substrate 80 and electrically connected to controller 88 using electrical traces in or on substrate 80. NVM 98 may include any type of non-volatile memory, including, for example, Read-only memory (ROM), electrically programmable read-only memory (EPROM), electrically erasable programmable read-only memory (EEPROM), flash memory, ferroelectric random access memory (FRAM), magnetoresistive random access memory (MRAM), giant magnetoresistive random access memory (GMRAM), phase change random access memory (PRAM), chalcogenide random access memory (CRAM), carbon nanotube-based random access memory (NRAM), or the like.

In some examples, NVM 98 may store a plurality of control voltages in a data structure in which each respective control voltage is associated with a pair of drive electrical contacts used to apply the electrical signal to tested material 76 and a pair of measurement electrical contacts used to determine the control voltage (whether the control voltage was actually measured using tested material 76, determined using multiple representative tested materials similar to tested material 76, or determined using a physics-based model of tested material 76).

Controller 88 may utilize the control voltage and the measured voltage to determine whether tested material 76 includes a crack or other defect. For example, controller 88 may determine a difference or ratio between a magnitude of the measured voltage associated with a measurement electrical contact of electrical contacts 78 and a magnitude of the control voltage associated with the same measurement electrical contact. Controller 88 then may compare this difference or ratio to a threshold voltage value or threshold ratio, and may determine that tested material 76 includes a crack or other defect in response to the difference being greater than the threshold voltage value or threshold ratio.

Figure 4:
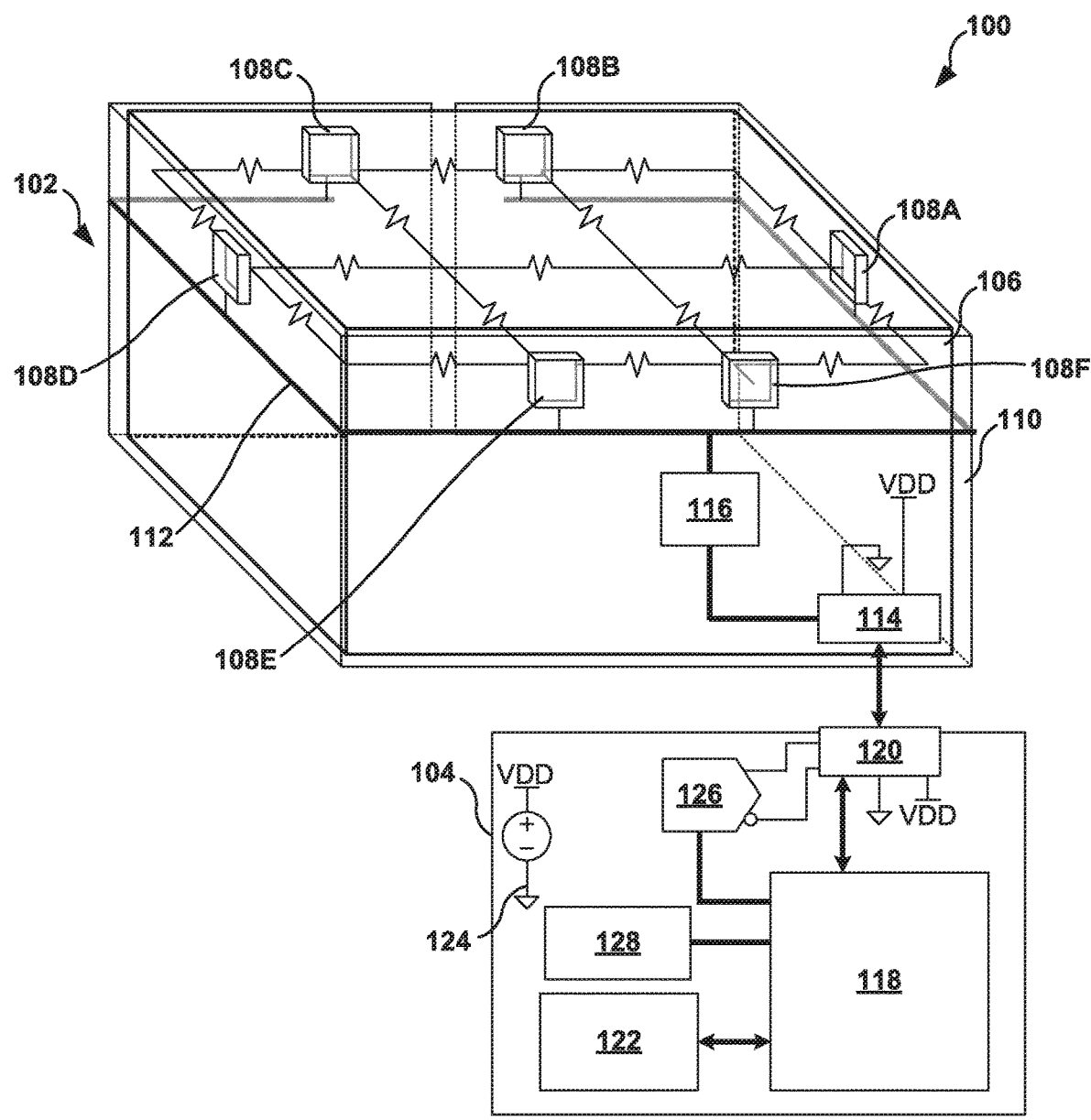

In some examples, rather than article 12 including controller 88, ADC 96, and memory 98, a measurement device may include one or more of these components. For example, FIG. 4 is a conceptual and schematic block diagram illustrating another example measurement system 100 for determining whether a tested material 106 includes a crack or other defect. In many respects measurement system 100 is similar to measurement system 70 of FIG. 3. For example, measurement system 100 includes an article 102 and a measurement device 104. Aside from the differences described herein, article 102 may be similar to article 72 of FIG. 3 and measurement device 104 may be similar to measurement device 74 of FIG. 3.

Similar to article 72 of FIG. 3, article 102 includes tested material 106, a plurality of electrical contacts 108, a substrate 110, a contact routing bus 112, a first electrical connector 114, and a programmable switch array 116. Each of these components may be similar to or substantially the same as the corresponding components described with reference to FIG. 3.

Similar to measurement device 74 of FIG. 3, measurement device 104 of FIG. 4 includes a second electrical connector 120, a user interface device 122, and a voltage source 124. Each of these components may be similar to or substantially the same as the corresponding components described with reference to FIG. 3.

Unlike measurement system 70 of FIG. 3, measurement device 104 includes controller 118, ADC 126, and NVM 128. Controller 118 is electrically connected to second electrical connector 120, user interface device 122, ADC 126, and NVM 128. By connecting first electrical connector 114 and second electrical connector 120, ADC 126 and controller 118 are also electrically connected to programmable switch array 116. By including additional components in measurement device 104 rather than article 102, article 102 may be less expensive to manufacture. As measurement device 104 may be used with multiple articles 102, reducing cost of article 102 and increasing cost of measurement device 104 may be desirable in some implementations.

Figure 5:
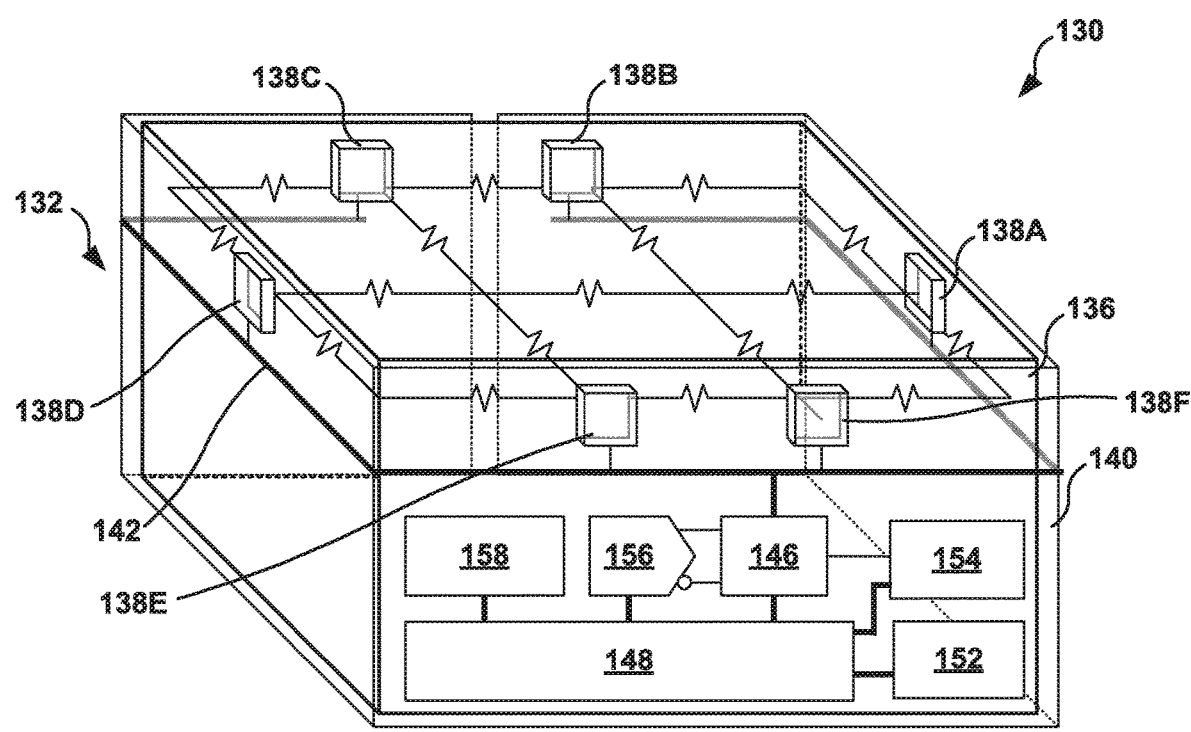

In other examples, rather than reducing cost and complexity of the article and increasing cost and complexity of the measurement device, all components may be integrated in the article, and the measurement system may omit a separate measurement device. Such integration may facilitate testing of an individual article, as no separate devices are required. FIG. 5 is a conceptual and schematic block diagram illustrating another example measurement system 130 for determining whether a tested material 136 includes a crack or other defect. In many respects measurement system 130 is similar to measurement system 70 of FIG. 3. For example, measurement system 130 includes an article 132. However, measurement system 130 omits a separate measurement device. Aside from the differences described herein, article 132 may be similar to article 72 of FIG. 3.

Similar to article 72 of FIG. 3, article 132 includes tested material 136, a plurality of electrical contacts 138, a substrate 140, a contact routing bus 142, and a programmable switch array 146. Each of these components may be similar to or substantially the same as the corresponding components described with reference to FIG. 3.

Unlike measurement system 70 of FIG. 3, article 132 may omit an electrical connector. Additionally, article 132 includes a controller 148, a user interface device 152, a power source 154, an ADC 156, and NVM 158. Controller 148 is electrically connected to programmable switch array 146, user interface device 152, power source 154, ADC 156, and NVM 158.

In some examples, power source 154 may also be electrically connected directly to programmable switch array 146 to output the electrical signal to a selected pair of drive electrical contacts from electrical contacts 138. Power source 154 may include any one of a selected source of electrical energy. For example, power source 154 may include a battery, a capacitor, a supercapacitor, a photovoltaic cell, a generator, a piezoelectric crystal, or the like.

For instance, power source 154 may include a photovoltaic cell and electronics for converting the power provided by the photovoltaic cell into a form useful for measurement system 130. The electronics may include, for example, temporary energy storage, such as a capacitor or rechargeable battery; a half- or full-wave rectifier; a voltage regulator; or the like.

By including additional components in article 132 rather than including a separate measurement device 134, measurement system 130 may not utilize electrical connectors between article 132 and an external device, which may improve reliability. Further, article 132 may be tested at any time, as no external devices are used for the testing.

Figure 6:
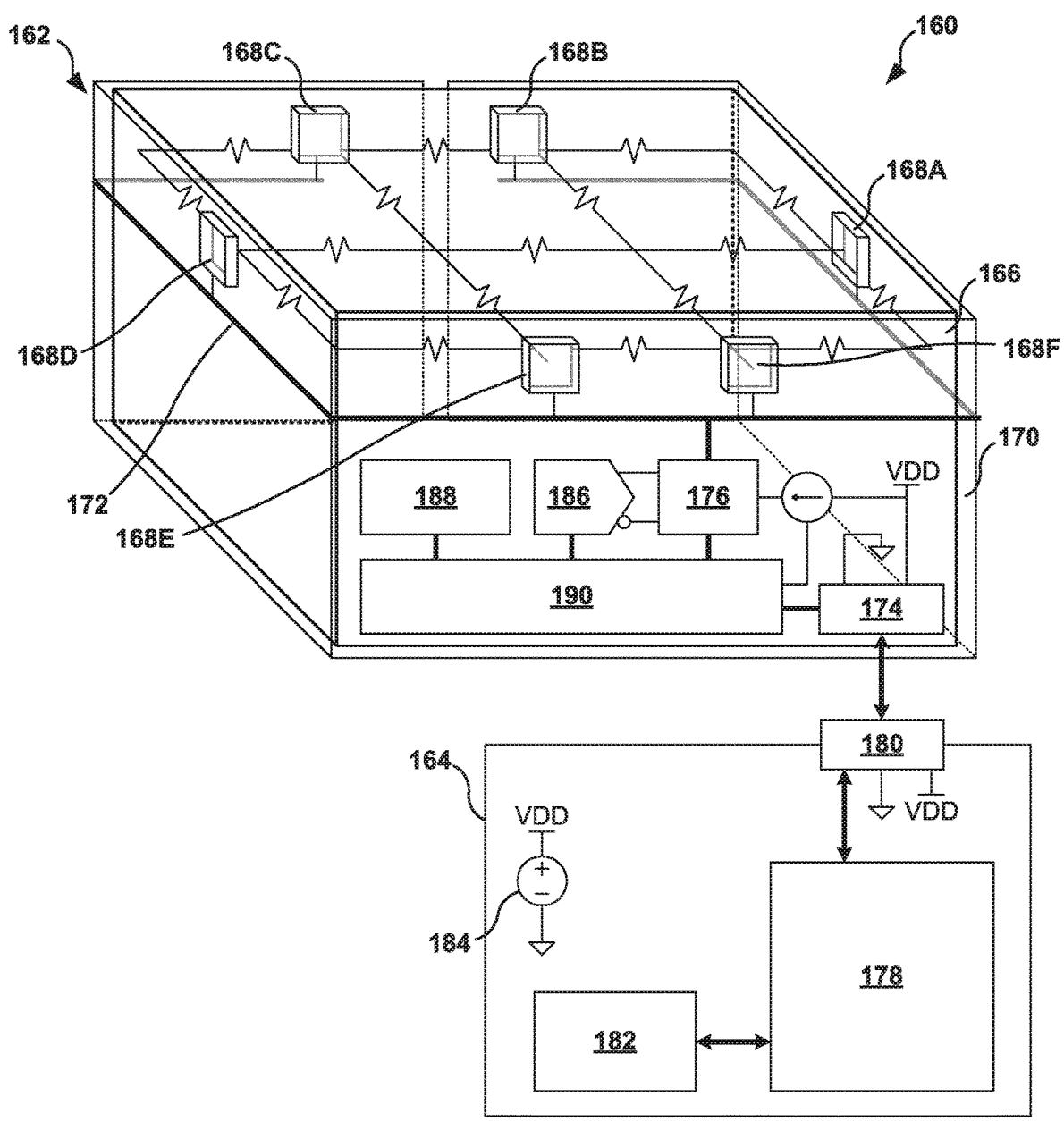

Other configurations of measurement systems are also contemplated. FIG. 6 is a conceptual and schematic block diagram illustrating another example measurement system 160 for determining whether a tested material 166 includes a crack or other defect. In many respects measurement system 160 is similar to measurement system 70 of FIG. 3. For example, measurement system 160 includes an article 162 and a measurement device 164. Aside from the differences described herein, article 162 may be similar to article 72 of FIG. 3 and measurement device 164 may be similar to measurement device 74 of FIG. 3.

Similar to article 72 of FIG. 3, article 162 includes a tested material 166, a plurality of electrical contacts 168, a substrate 170, a contact routing bus 172, a first electrical connector 174, a programmable switch array 176, an ADC 96, and a NVM 98. Each of these components may be similar to or substantially the same as the corresponding components described with reference to FIG. 3.

Unlike article 72 of FIG. 3, article 162 does not include a controller, but instead includes a data communication and control device 190. Data communication and control device 190 is electrically connected to first electrical connector 174, programmable switch array 176, ADC 186, and NVM 188.

Similar to measurement device 74 of FIG. 3, measurement device 164 includes a second electrical connector 180, a user interface device 182, and a voltage source 184. Unlike measurement device 74 of FIG. 3, measurement device 164 includes a controller 178. Controller 178 is electrically connected to user interface device 182 and second electrical connector 180.

In measurement system 160, controller 178 controls overall operation of system 160. Controller 178 may communicate commands to data communication and control device 190 via first connector 174 and second connector 180. Data communication and control device 190 then controls programmable switch array 176, ADC 186, and NVM 188 based on the commands received from controller 178. Further, once ADC 186 determines measured voltages for one or more pair of measurement electrical contacts from electrical contacts 168, data communication and control device 190 may retrieve the measured voltages from ADC 186 and communicate the measured voltages to controller 178. Controller 178 then may determine whether tested material 166 includes a crack or other defect based on the measured voltages. In some examples, controller 178 also may cause data communication and control device 190 to retrieve one or more control voltages from NVM 188 and communicate the one or more control voltages to controller 178 for use in determining whether tested material 166 includes a crack or other defect.

Figure 7:
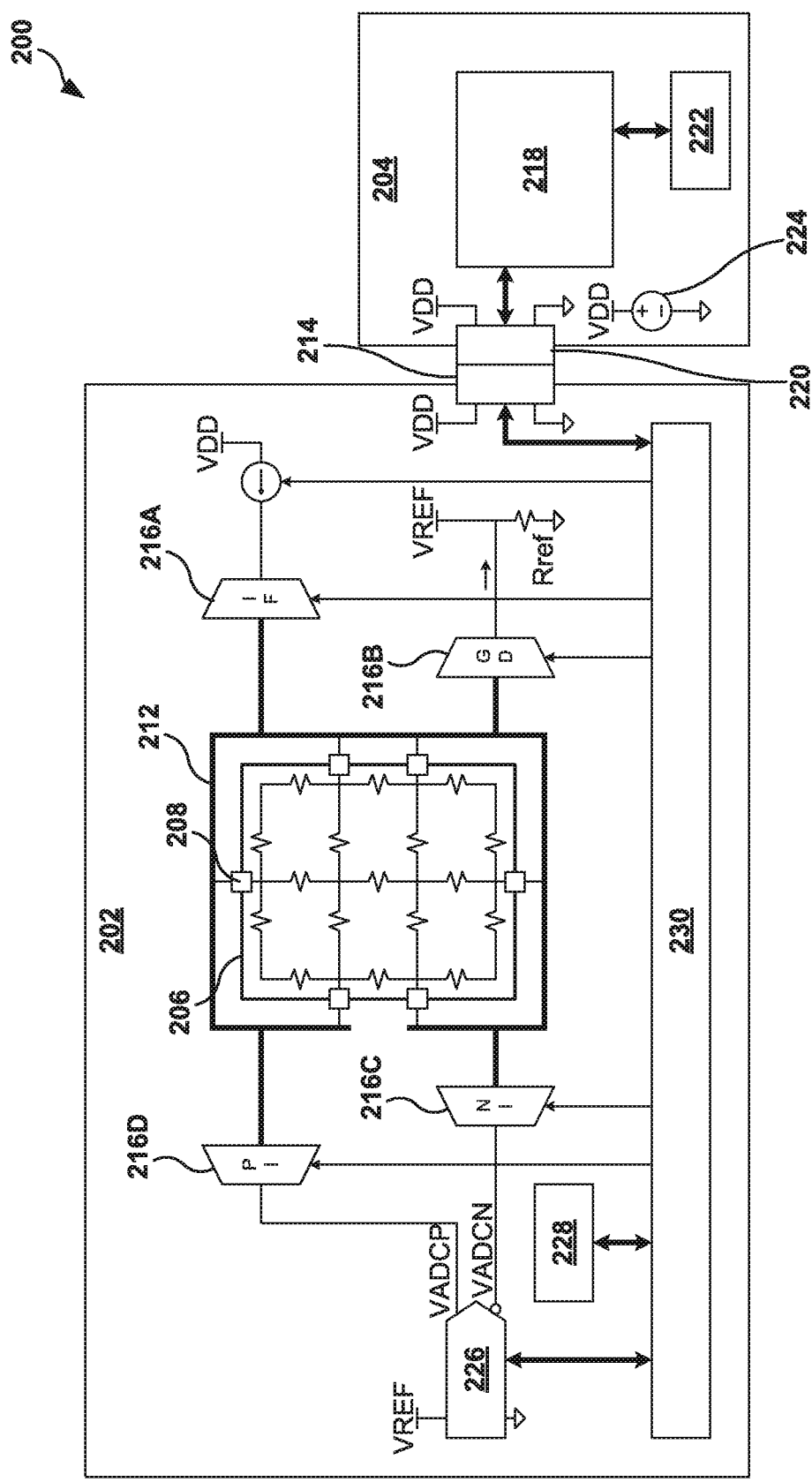
FIG. 7 is a functional block diagram illustrating an example measurement system for determining whether a tested material includes a crack or other defect.

FIG. 7 is a functional block diagram illustrating an example implementation of measurement system 160 of FIG. 6 for determining whether a tested material includes a crack or other defect. Measurement system 200 of FIG. 7 includes an article 202 and a measurement device 204. Article 202 includes a tested material 206, a plurality of electrical contacts 208 (only one of which is labeled in FIG. 7), a contact routing bus 212, a first electrical connector 214, a plurality of programmable switch arrays 216A-216D (collectively, "programmable switch arrays 216"), an ADC 226, a NVM 228, and a data communication and control device 230. Aside from any differences described herein, each of these components may be similar to the corresponding component described with respect to FIG. 6.

Unlike article 162 of FIG. 6, article 202 of FIG. 7 includes a plurality of programmable switch arrays 216. In the specific example of FIG. 7, article 162 includes four programmable switch arrays 216. Each of programmable switch arrays 216 may include, for example, N inputs, N switches, and 1 output, where N is the number of electrical contacts 208. For each switch array of programmable switch arrays 216, a respective input of the N inputs is electrically connected to a respective one of electrical contacts 208. The output of first programmable switch array 216A may be electrically connected to a current source, which provides a force current to tested material 206 during testing. The output of second programmable switch array 216B may be electrically connected to a return, such as ground via a reference resistor. The output of third programmable switch array 216C is electrically connected to a first input (e.g., a negative terminal) of ADC 226. The output of fourth programmable switch array 216D is electrically connected to a second input (e.g., a positive terminal) of ADC 226. ADC 226 may be differential ADC that accepts signals through the first input and the second input and digitizes the difference between the two signals.

Figure 8:
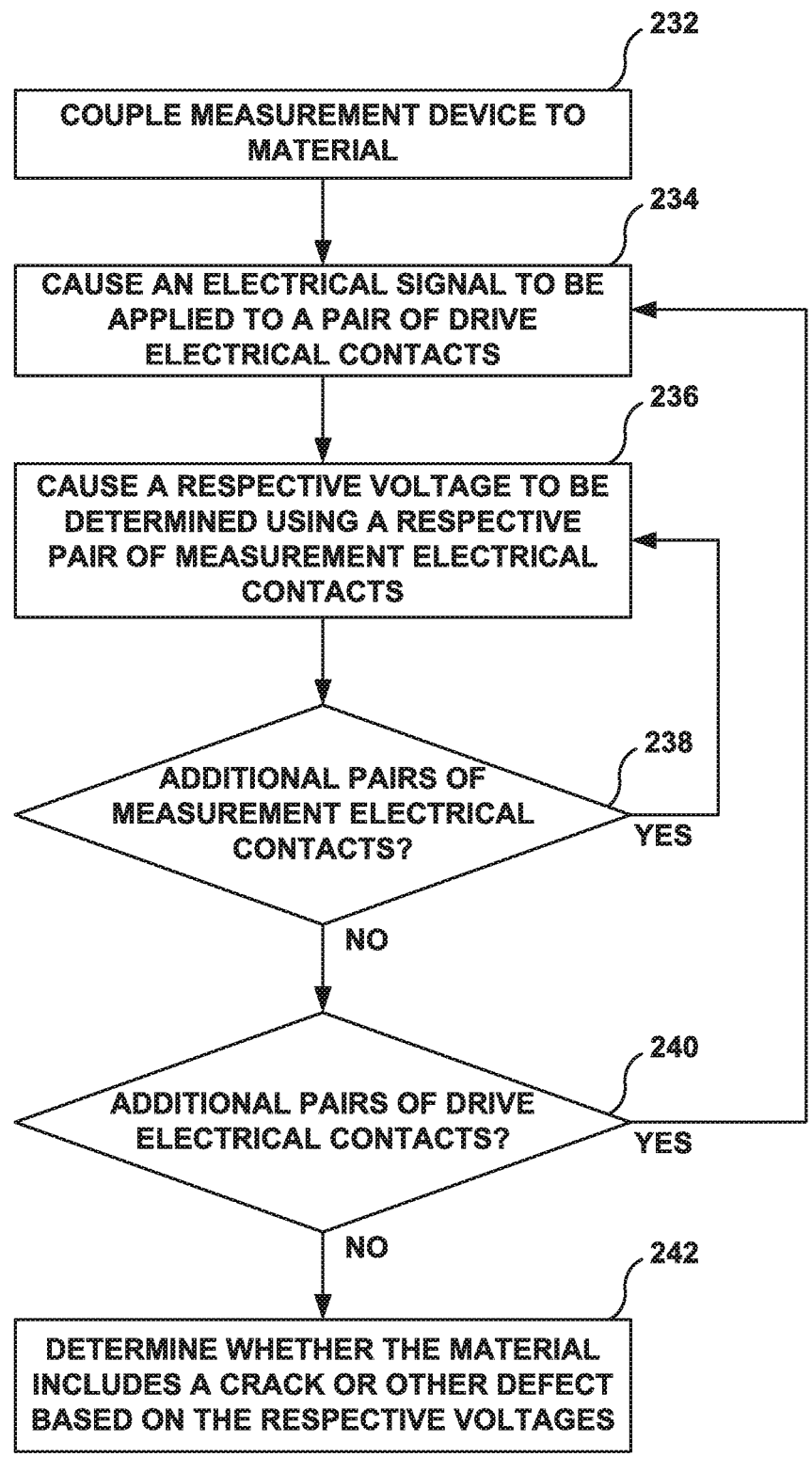
FIG. 8 is flow diagram illustrating an example technique for determining whether a tested material includes a crack or other defect.

FIG. 8 is flow diagram illustrating an example technique for determining whether a tested material includes a crack or other defect. The technique of FIG. 8 will be described with concurrent reference to measurement system 160 of FIG. 6, but it will be understood that other systems may perform the technique of FIG. 8 (e.g., system 10 of FIG. 1, system 40 of FIG. 2, system 70 of FIG. 3, system 100 of FIG. 4, system 130 of FIG. 5, or system 200 of FIG. 7), and that measurement system 160 may be used to perform other techniques.

The technique of FIG. 8 optionally includes coupling a measurement device 164 to article 162 (232). Measurement device 164 may be coupled to article 162 using electrical connectors 174 and 180.

Once measurement device 164 is coupled to article 162 (232), the technique of FIG. 8 may include causing, by controller 178, an electrical signal to be applied to a set of drive electrical contacts (234). For example, controller 178 may output a control signal to data communication and control device 190 that instructs data communication and control device 190 to cause programmable switch array 176 to electrically connect a selected set of electrical contacts 168 to a current source or to voltage source 184 to serve as a set of drive electrical contacts. Data communication and control device 190 may cause programmable switch array 176 to electrically connect the selected set of electrical contacts 168 to the current source or to voltage source 184 to serve as the set of drive electrical contacts.

The selected set of electrical contacts 168 may include any two or more electrical contacts of electrical contacts 168. In some examples, the selected set of electrical contacts 168 may be adjacent to each other; in other examples, the selected set of electrical contacts 168 may be spaced apart. For example, in some instances, the selected set of electrical contacts 168 may be substantially opposite each other in the array of electrical contacts 168, or may be separated by a predetermined number of electrical contacts 168, e.g., separated by two electrical contacts of electrical contacts 168. In some examples, the set of electrical contacts 168 may include two electrical contacts that are on a symmetry of tested material 166.

Controller 178 then may cause the electrical signal to be applied to the first set of drive electrical contacts, e.g., via programmable switch array 176. The electrical signal may include an AC signal or a DC signal, and may include a current signal or a voltage signal. In some examples, the type of electrical signal may depend on the composition of tested material 166. For example, a DC signal may be used to measure a voltage of an electrically conductive or electrically semiconductive material, while an AC signal may be used to measure a voltage of an electrically conductive material, an electrically semiconductive material, or a dielectric material. Controller 178 also may control the amplitude, duration, frequency, and other signal characteristics of the electrical signal.

The technique of FIG. 8 also includes, while the electrical signal is being applied to the set of drive electrical contacts (234), causing a measured voltage to be determined using a measurement electrical contact electrically coupled to tested material 166 (236). For example, controller 178 may output a control signal to data communication and control device 190 that instructs data communication and control device 190 to cause programmable switch array 176 to electrically connect a selected pair of electrical contacts 168 or an electrical contact and a reference electrode to ADC 186 to serve as a set of measurement electrical contacts. Data communication and control device 190 may cause programmable switch array 176 to electrically connect the selected pair of electrical contacts 168 or the selected electrical contact and the reference electrode to ADC 186 to serve as the pair of measurement electrical contacts.

The selected pair of measurement electrical contacts may be any two electrical contacts from electrical contacts 168 or may be a reference electrode and any one of electrical contacts 168. In some examples, the two electrical contacts in the pair of measurement electrical contacts may be adjacent to each other. In other examples, the two electrical contacts in the pair of measurement electrical contacts may be spaced each other with one or more electrical contacts between. Using adjacent electrical contacts as the pair of measurement electrical contacts may result in a higher signal-noise-ratio in the voltage measurement, but may reduce an area of tested material 166 for which the voltage is measured. Regardless of the particular electrical contacts coupled to ADC 186, controller 178 may cause ADC 186 to determine a voltage using the measurement electrical contacts (236) while the electrical signal is being applied to the set of drive electrical contacts (234).

In some examples, controller 178 may be configured to cause ADC 186 to determine a respective measured voltage for a plurality of measurement electrical contacts for each pair of drive electrical contacts. Hence, in some examples, the technique of FIG. 8 further includes determining whether there is an additional measurement electrical contact for which to determine a measured voltage (238) for the selected pair of drive electrical contacts. In response to determining that there is an additional electrical contact to be used as a measurement electrical contact, controller 178 may cause programmable switch network 176 to couple the selected electrical contacts to ADC 186. Controller 178 then may cause ADC 186 to determine a measured voltage using the selected measurement electrical contacts (236).

Controller 178 may repeat this determination of whether additional electrical contacts 168 are to be used as a measurement electrical contact (238), causing coupling of a selected measurement electrical contact to ADC 186 using switch network 20, and causing ADC 186 to determine a respective measured voltage (236) until controller 178 determines there are no additional electrical contacts 168 to be used as a measurement electrical contact for the selected pair of drive electrical contacts (the "NO" branch of decision block 238).

In some examples, the technique of FIG. 8 optionally includes determining, by controller 178, whether there is an additional pair of drive electrical contacts to which to apply the electrical signal (240). For example, controller 178 may be configured to utilize each unique pair of electrical contacts from electrical contacts 168 or each unique pair of electrical contacts separated by a predetermined number of electrical contacts (e.g., two electrical contacts) as a pair of drive electrical contacts. In other examples, only a single pair of electrical contacts 168 may be utilized as a pair of drive electrical contacts, and the technique of FIG. 8 may not include determining whether there is an additional pair of drive electrical contacts to which to cause the electrical signal to be applied (240).

Once controller 178 has determined that there are no additional pairs of electrical contacts 168 to be used as a pair of drive electrical contacts (the "NO" branch of decision block 240), controller 178 may determine whether tested material 16 includes a crack or other defect based on the measured voltage or measured voltages (242). Controller 178 may cause data communication and control device 190 to retrieve the measured voltages from ADC 186 and communicate the measured voltages to controller 178.

In some examples, controller 178 may determine whether tested material 166 includes a crack or other defect based on a comparison between voltages. For example, controller 178 or another computing device may perform steps (232)-(240) of the technique of FIG. 8 on tested material 166 at a first time at which it is known that tested material 166 is intact, i.e., does not include a crack or other defect. For example, the first time may be a time at which tested material 166 is manufactured, or a time at which an independent measurement (e.g., X-ray radiology or X-ray CT scan) may be used to verify that tested material 166 is intact, undamaged, or does not include a crack. These respective control voltages may be stored in NVM 188 for later use. For example, the respective control voltages may be stored in a data structure in which each respective control voltage is associated with a pair of drive electrical contacts to which the electrical signal was applied during the voltage measurement and a pair of measurement electrical contacts with which the respective control voltage was measured. In other examples, the control voltage may be determined using a model of the material in an intact (undamaged) state, or the control voltage may be determined as an average (e.g., mean) of a plurality of similar materials (e.g., in geometry and composition) that are known to be intact (undamaged).

Controller 178 may cause data communication and control device 190 to retrieve the control voltages from NVM 188 and communicate the control voltages to controller 178. Controller 178 then may compare the respective measurement voltages to respective control voltages and determine whether tested material 166 includes a crack or other defect based on the comparison. For example, controller 178 may compare each respective measured voltage with a corresponding (i.e., associated with the same pair of drive electrical contacts and the same pair of measurement electrical contacts) control voltage. As an example, controller 178 may subtract the corresponding control voltage from the respective measured voltage. In some examples, controller 178 may compare the respective voltage difference (between the respective measurement voltage and the respective control voltage) to a threshold voltage value.

The threshold voltage value may be selected so that a voltage difference above the threshold voltage value is meaningful (e.g., indicative of a crack or other defect) and a voltage difference below the threshold voltage value is not meaningful (e.g., is not indicative of a crack or other defect). In some examples, the threshold value may be selected to be a voltage value that is slightly greater than a noise floor of the measurement, such that any voltage difference that exceeds the noise floor is determined by controller 178 to be indicative of a crack or other defect.

In some examples, after comparing each respective measurement voltage against a corresponding control voltage and comparing the difference to the threshold voltage value to determine if the respective measurement voltage is indicative of a crack or other defect, controller 178 may determine whether a crack or other defect is present in tested material 166 based on the plurality of indications. For example, controller 178 may determine a number of differences that are indicative of a crack and compare this number of differences to a threshold number of differences to determine if tested material 166 includes a crack or other defect.

As another example, controller 178 may determine whether tested material 166 includes a crack or other defect based on the respective measured voltages (242) by comparing each respective measured voltage to a threshold voltage value. For example, controller 178 may compare the respective measured voltage to the threshold voltage value, and may determine that the respective measured voltage indicates that tested material 166 includes a crack or other defect in response to the respective measured voltage being greater than the threshold voltage value. In some examples, the threshold voltage may be selected so that a measured voltage above the threshold voltage value is indicative of a crack or other defect and a measured voltage below the threshold voltage value is not indicative of a crack or other defect. In some examples, after comparing each respective measured voltage to the threshold voltage value to determine if the respective measured voltage is indicative of a crack or other defect, controller 178 may determine whether tested material 166 includes a crack or other defect based on the plurality of indications. For example, controller 178 may determine a number of measured voltages that are indicative of a crack and compare this number of measured voltages to a threshold number of measured voltages to determine if tested material 166 includes a crack or other defect.

In some examples, rather than utilizing differences between a measured voltage and a corresponding control voltage, controller 178 may determine a ratio between each respective measured voltage and a corresponding respective control voltage. In some examples, multiple electrode pair voltages may be associated with the same pair of measurement electrical contacts from electrical contacts 168, e.g., due to multiple measurements with different pairs of drive electrical contacts or inductors. In some such examples, controller 178 may determine a ratio between each respective measured voltage and the respective control voltage associated with the same pair of electrical contacts 168. By determining a ratio between the measured voltage and the control voltage, effects of temperature differences in the material between the time at which the control voltage was determined and the measured voltage was determined may be reduced.

Controller 178 may utilize the ratio(s) in one of a variety of techniques to determine whether tested material 166 includes a crack or other defect. For example, controller 178 may utilize pattern recognition. In some examples, for each measurement electrical contact from electrical contacts 168, controller 178 may sum all ratios associated with the respective measurement electrical contact. Controller 178 may then determine whether any adjacent sets of measurement electrical contacts are associated with sums that follow a predetermined pattern, such as a low-high-low pattern, a low-high-high-high-low pattern, or the like. The particular pattern that indicates that tested material 166 includes a crack or other defect may depend on positioning of electrical contacts 168, including spacing between adjacent measurement system electrical contacts of electrical contacts 168; crack location and orientation within tested material 166; and the like. In other examples, controller 178 may use pattern recognition on each set of ratios associated a respective measurement electrical contact, and may compare the results of the various pattern recognitions to arrive at a final determination of whether tested material 166 includes a crack or other defect.

As another example, controller 178 may determine whether tested material 166 includes a crack or other defect by determining whether any of the measured voltages, ratios, or the sum of measured voltages or ratios, associated with a single pair of measurement electrical contacts, is an outlier compared to measured voltages, ratios, or sums of measured voltages or ratios, associated with other measurement electrical contacts. Cracks or other defects are expected to create regions of higher electrical resistance in tested material 166, which is expected to result in higher voltages being measured for measurement electrical contacts in which current will flow across or through regions of higher electrical resistance. Hence, an outlier of higher temperature-corrected electrode pair values indicates that tested material 166 includes a crack or other defect.

As a further example, controller 178 may determine whether tested material 166 includes a crack or other defect by determining an overall score for tested material 166. For example, controller 178 may sum all ratios associated with a respective measurement electrical contact to generate a single value associated with each respective measurement electrical contact. Controller 178 then may mathematically manipulate these values to arrive at a single score for tested material 166. For example, controller 178 may sum the ratios, take each ratio to a predetermined power and sum the products, average the ratios, determine a weighted average of the ratios, or the like to determine a single score for testing material 166. Controller 178 then may compare the single score to a threshold score value and determine that tested material 166 includes a crack or other defect if the single score is greater than the threshold score value.

As another example, in implementations in which electrical contacts 168 are positioned symmetrically about tested material 166 with reference to a symmetry of tested material 166, a set of drive electrical contacts may be positioned on the symmetry of tested material 166, e.g., on a plane of symmetry of tested material 166. The first measurement electrical contact and second measurement electrical contact may be positioned symmetrically with reference to the symmetry of tested material 166, e.g., with reference to a plane of symmetry of tested material 166. In such an example, a first measured voltage determined using the first measurement electrical contact and a second measured voltage determined using the second measurement electrical contact are expected to be substantially the same (e.g., the same or nearly the same) in the absence of a crack or other defect in tested material 166. For example, in the absence of a crack or defect in tested material 166, the first voltage and the second voltage may be within a predetermined percentage of each other, such as, for example, within about 20%, 10%, 5%, or 1% of each other. Any difference between the first and second measured voltages that is greater than a threshold difference may indicate that tested material 166 includes a crack or other defect.

As another example, in implementations in which electrical contacts 168 are positioned symmetrically about tested material 166 with reference to a symmetry of tested material 166, a first pair of drive electrical contacts and a second pair of drive electrical contacts may be different from each other. The first pair of drive electrical contacts and a first measurement electrical contact are a first group of electrical contacts and a second pair of drive electrical contacts and the second measurement electrical contact are a second group of electrical contacts. The first and second group of electrical contacts may be symmetric with each other relative to the symmetry of tested material 166, e.g., a plane of symmetry of tested material 166. As such, in the absence of a crack or other defect in tested material 166 the first measured voltage and the second measured voltage are expected be substantially the same (e.g., the same or nearly the same). Any difference between the first and second measured voltages that is greater than a threshold difference may indicate that tested material 166 includes a crack or other defect.

As a further example, electrical contacts 168 may be positioned so that, for each group that includes a pair of drive electrical contacts and a measurement electrical contact, the measured voltage in the absence of a crack or other defect is substantially the same. The respective groups of electrical contacts may or may not be symmetric to another group of electrical contacts, and tested material 166 may or may not include a symmetry. As such, regardless of the groups of electrical contacts selected as the first group of electrical contacts and the second group of electrical contacts, in the absence of a crack or other defect in material 166 the first measured voltage and the second measured voltage may be substantially the same (e.g., the same or nearly the same). Any difference between measured voltages that is greater than a threshold difference may indicate that tested material 166 includes a crack or other defect.

As an additional example, controller 178 may calculate an approximate impedance distribution within tested material 166 to determine whether tested material 166 includes a crack or other defect (242). In some examples, reconstruction of the impedance distribution may be achieved by minimizing the difference between the output of a physics-based simulation tool with the respective control voltages, and the respective measurement voltages. For example, controller 178 may be programmed with a finite element model (FEM) of tested material 166 which implements the physics-based simulation. The FEM of tested material 166 may include substantially accurate (e.g., accurate or approximately accurate) geometry of tested material 166 (e.g., the shape and volume of tested material 166), and also may include substantially accurate (e.g., accurate or approximately accurate) locations of electrical contacts 168 attached to tested material 166. In some examples, the FEM of tested material 166 may additionally include representative properties of tested material 166, including, for example, conductivity, resistivity, other related electrical properties, and the like. The FEM of tested material 166 may include representative properties of tested material 166 for each respective node representing tested material 166.

Calculating the approximate impedance distribution to determine whether tested material 166 includes a crack of other defect is an ill-posed inverse problem, in which the outputs (the respective measurement voltages) are known but the properties of tested material 166 that produce the outputs are unknown. Moreover, more than one set of properties of tested material 166 may produce the outputs. Hence, controller 178 may utilize a regularization technique to constrain the solution to solutions more likely to represent the properties of tested material 166 that would produce the respective measurement voltages.

In particular, controller 178 may generate an objective function which combines outputs of the physics-based model, respective control voltages, the respective measurement voltages, and the regularization term. For example:

$$\underset{x}{\operatorname{argmin}}\left\{\mathcal{F}(x) := \frac{1}{2}\|f(x) - y\|_{l_2}^2 + \lambda \frac{1}{2}\|Rx\|_{l_2}^2\right\}$$

where x is the approximate change in impedance distribution, f is an operator calculating the simulated difference in voltages based on input x utilizing the physics-based simulation, y is the measured difference in voltages, $l_2$ is a chosen norm, R is the regularization matrix, and X is the chosen weight of the regularization or regularization parameter. Controller 178 may determine respective model control voltages based on the physics-based model and inputs representative of the electrical signal(s) applied to the respective pairs of drive electrical contacts. The respective model control voltages may be associated with respective pairs of measurement electrical contacts for each respective pair of drive electrical contacts used to collect the control voltages from tested material 166. Controller 178 then may determine, using the physics-based model and inputs representative of the electrical signal(s) applied to the respective pairs of drive electrical contacts, respective model measurement voltages. The respective model measurement voltages may be associated with respective pairs of measurement electrical contacts for each respective pair of drive electrical contacts used to collect the measurement voltages from tested material 166. For each respective model measurement voltage, controller 178 may determine a respective difference between the respective model measurement voltage and the respective model control voltage (f(x) in the equation above).

Controller 178 also may determine a respective difference between the respective measurement voltage and the respective control voltage for each respective measurement voltage measured using tested material 166 to generate a set of actual voltage differences (y in the equation above).

Controller 178 then may minimize the objective function by updating one or more parameters of the physics-based model. Controller 178 may continue to iterate the model until a stopping criterion is reached. Controller 178 then may determine the approximate impedance distribution (or approximate change in impedance distribution) that is representative of the condition of tested material 166. When iteration completes the input to the model is the approximate impedance distribution.

Controller 178 may then determine whether tested material 166 includes a crack or other defect based on the approximate change in impedance distribution. For example, controller 178 may determine whether tested material 166 includes a crack or other defect based on the magnitude and location of the approximate impedance change within the material. In some examples, only the real portion of the impedance—the conductivity or resistivity—may be used by controller 178 to determine whether tested material 166 includes a crack or other defect.

In some examples, rather than utilizing respective control voltages and respective model control voltages, controller 178 may determine an approximate impedance distribution using an absolute form of the objective function, in which x is the impedance distribution, f is an operator calculating a set of the simulated voltages based on input x utilizing the physics-based simulation, y is a set of the measured voltages, $l_2$ is a chosen norm, R is the regularization matrix, and λ is the chosen weight of the regularization or regularization parameter.

In any of the techniques described herein, controller 178 may output an indication of the determination of whether tested material 166 includes a crack or other defect to user interface device 182 for output to a user. In some examples, the representation may include a simplified output, such as an indication of "Yes" or "No," "Crack" or "No Crack," "Damaged" or "Intact," or the like. The representation may be textual, icon-based, color-based, audible, tactile, or the like. For example, the representation may include a green light to represent that tested material 166 is still intact or a red light to represent that tested material 166 is damaged or includes a crack or other defect.

Figure 9:
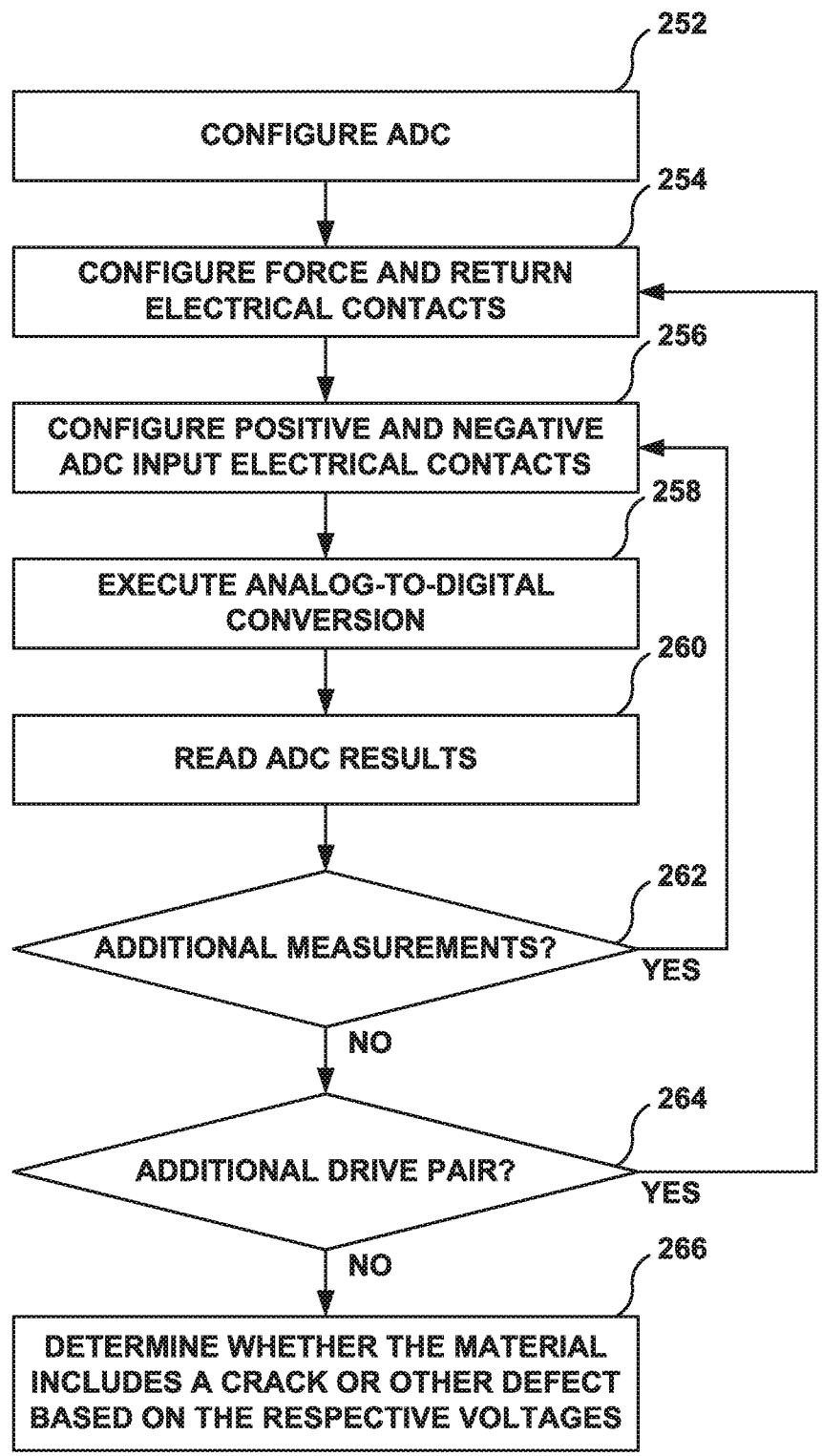
FIG. 9 is flow diagram illustrating another example technique for determining whether a tested material includes a crack or other defect.

FIG. 9 is flow diagram illustrating another example technique for determining whether a tested material includes a crack or other defect. The technique of FIG. 9 will be described with concurrent reference to measurement system 200 of FIG. 7, but it will be understood that other systems may perform the technique of FIG. 9 (e.g., system 10 of FIG. 1, system 40 of FIG. 2, system 70 of FIG. 3, system 100 of FIG. 4, system 130 of FIG. 5, or system 160 of FIG. 6), and that measurement system 200 may be used to perform other techniques.

The technique of FIG. 9 optionally includes coupling measurement device 204 to article 202 (not shown in FIG. 9). Measurement device 204 may be coupled to article 202 using electrical connectors 214 and 220.

The technique of FIG. 9 also includes configuring ADC 226 (252). For example, controller 218 may send a series of commands to data communication and control device 230 to cause data communication and control device 230 to configure ADC 226 (252). Data communication and control device 230 may configure one or more operational parameters of ADC 226 including, for example, reference voltage, gain, common mode range, and the like. In some examples, data communication and control device 230 may configured the reference voltage of ADC 226 to be a reference voltage VREF measured at a reference resistor Rref that is between the input of second programmable switch array 216B and ground.

The technique of FIG. 9 also may include configuring force and return electrical contacts for a pair of drive electrical contacts (254). For example, controller 218 may send a series of commands to data communication and control device 230 to cause data communication and control device 230 to control first programmable switch array 216A to connect to a selected electrical contact of electrical contacts 208. Controller 218 also may send a series of commands to data communication and control device 230 to cause data communication and control device 230 to control second programmable switch array 216B to connect to a selected electrical contact of electrical contacts 208. The electrical contact connected to first programmable switch array 216A is electrically connected to a current source as the force electrical contact, and the electrical contact connected to second programmable switch array is electrically connected to ground as the return electrical contact.

The technique of FIG. 9 further may include configuring positive and negative ADC input electrical contacts, also referred to as measurement electrical contacts (256). For example, controller 218 may send a series of commands to data communication and control device 230 to cause data communication and control device 230 to control third programmable switch array 216C to connect to a selected electrical contact of electrical contacts 208. Controller 218 also may send a series of commands to data communication and control device 230 to cause data communication and control device 230 to control fourth programmable switch array 216D to connect to a selected electrical contact of electrical contacts 208. The electrical contact connected to third programmable switch array 216C is electrically connected to a negative ADC input, and the electrical contact connected to fourth programmable switch array is electrically connected to a positive ADC input. In some examples, only one electrical contact can be connected to the positive input of the ADC at a time, and only one electrical contact can be connected to the negative input of the ADC at a time.

The technique of FIG. 9 also includes executing analog-to-digital conversion (258). For example, controller 218 may send a command data communication and control device 230 to cause ADC 226 to execute an analog-to-digital conversion (258). Along with this, controller 218 may cause an electrical signal to be applied to the force and return electrical contacts, e.g., by the current source. Based on the command, data communication and control device 230 enables ADC 226 and causes ADC 226 to digitize the voltage difference between the positive input and the negative input.

ADC 226 makes the differential voltage measurement to determine an equivalent resistance. The digitized ADC value for the voltage differential between two electrical contacts P and Q is given by:

$$ADC(P, Q) = (2^{\wedge}[Nbit-1]) * Kpga * (VADCP - VADCN)/Vref =$$
$$(2^{\wedge}[Nbit-1]) * Kpga * |(Vnode[P, G] - Vnode[Q, G])|/(Iforce * Rref) =$$
$$(2^{\wedge}[Nbit-1]) * Kpga * Iforce * Req[P, Q]/(Iforce * Rref) =$$
$$(2^{\wedge}[Nbit-1]) * Kpga * Req[P, Q]/Rref$$

Where ADC(P,Q) is the digitized differential voltage between nodes P and Q, VADCP is the voltage at the positive input of ADC 226, VADCN is the voltage at the negative input of ADC 226, Iforce is the force current injected into tested material 206, Rref is the Ground return reference resistance, Nbit is the resolution of ADC 226 in bits, and Kpga is the programmable gain amplifier gain setting (optional). As can be seen above, the digitized ADC value of the voltage differential yields a resistance ratio that is independent of the power supply and the force current and dependent on a gain value and a single reference resistor, Rref, whose value can be tightly controlled.

In response to ADC 226 finishing the analog-to-digital conversion (e.g., as indicated by a status line or register value), controller 218 may read the results from ADC 226 via the data communication and control device 230 (260).

In some examples, the technique of FIG. 9 may include determining whether additional measurements are to be made (262). For example, controller 218 may make the determination based on whether any additional electrical contacts 208 are remaining with which to make additional measurements. In response to determining that additional measurements are to be made (the "YES" branch of decision block 262), controller 218 may configure positive and negative ADC input electrical contacts, also referred to as measurement electrical contacts (256), cause ADC 226 to execute an analog-to-digital conversion (258), and read the results from ADC 226 via data communication and control device 230. Controller 218 may repeat this determination (262), configuring of positive and negative ADC input electrical contacts (256), causing of ADC 226 to execute an analog-to-digital conversion (258), and reading the results from ADC 226 via data communication and control device 230 until controller 218 determines that no additional measurements are to be made for the selected pair of drive electrical contacts (the "NO" branch of decision block 262).

In some examples, the technique of FIG. 9 optionally includes determining, by controller 218, whether there is an additional pair of drive electrical contacts (force and return electrical contacts) to which to apply the electrical signal (264). For example, controller 218 may be configured to utilize each unique pair of electrical contacts from electrical contacts 208 or each unique pair of electrical contacts separated by a predetermined number of electrical contacts (e.g., two electrical contacts) as a pair of drive electrical contacts (force and return electrical contacts). In other examples, only a single pair of electrical contacts 208 may be utilized as a pair of drive electrical contacts, and the technique of FIG. 9 may not include determining whether there is an additional pair of drive electrical contacts (force and return electrical contacts) to which to cause the electrical signal to be applied (264).

Once controller 218 has determined that there are no additional pairs of electrical contacts 208 to be used as a pair of drive electrical contacts (the "NO" branch of decision block 264), controller 218 may determine whether tested material 16 includes a crack or other defect based on the measured voltage or measured voltages (266), e.g., using any of the techniques described herein, including those described with respect to FIG. 8. Controller 218 also may output an indication of the determination of whether tested material 206 includes a crack or other defect to user interface device 222 for output to a user. In some examples, the representation may include a simplified output, such as an indication of "Yes" or "No," "Crack" or "No Crack," "Damaged" or "Intact," or the like. The representation may be textual, icon-based, color-based, audible, tactile, or the like. For example, the representation may include a green light to represent that tested material 206 is still intact or a red light to represent that tested material 206 is damaged or includes a crack or other defect.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Clause 1: An article comprising: a tested material; a plurality of electrical contacts distributed about and electrically connected to the tested material; a programmable switch array electrically connected to the plurality of electrical contacts via a plurality of electrical connections; and a controller electrically coupled to the programmable switch array. The controller may be configured to: cause an electrical signal to be applied to a pair of drive electrical contacts from the plurality of electrical contacts; cause a measured voltage to be determined using a measurement electrical contact from the plurality of electrical contacts; and determine whether the tested material includes a crack or other defect based on the measured voltage.

Clause 2: The article of clause 1, further comprising a nonvolatile memory device attached to tested material, wherein: the nonvolatile memory device stores a control voltage; and the controller is further configured to retrieve the control voltage from the nonvolatile memory device and determine whether the tested material includes the crack or other defect based on the measured voltage and the control voltage.

Clause 3: The article of clause 2, wherein the controller includes the nonvolatile memory.

Clause 4: The article of clause 2, wherein the controller is configured to determine whether the tested material includes a crack or other defect based on a ratio between the measured voltage and the control voltage or a difference between the measured voltage and the control voltage.

Clause 5: The article of any one of clauses 1 to 4, further comprising a power source.

Clause 6: The article of clause 5, wherein the power source comprises a voltage source.

Clause 7: The article of clause 5 or 6, wherein the power source comprises a photovoltaic cell.

Clause 8: The article of clause 7, wherein the power source further comprises energy storage.

Clause 9: The article of any one of clauses 1 to 8, further comprising an analog-to-digital converter electrically connected to the programmable switch array and the controller.

Clause 10: The article of clause 9, wherein the pair of drive electrical contacts comprise a force electrical contact and a return electrical contact, and wherein the controller is configured to control the programmable switch array to select the force electrical contact, the return electrical contact, and the measurement electrical contact from the plurality of electrical contacts, and electrically connect the measurement electrical contact to an input of the analog-to-digital converter.

Clause 11: The article of any one of clauses 1 to 10, wherein the plurality of electrical contacts are arranged symmetrically on the tested material with reference to a symmetry of the tested material.

Clause 12: The article of clause 11, wherein the symmetry is a point, a line, a plane, a curve, or a manifold, and wherein a single mathematical operation made with reference to the symmetry maps each electrical contact of the plurality of electrical contacts to another electrical contact of the plurality of electrical contacts.

Clause 13: The article of clause 11 or 12, wherein the controller is configured to: cause the electrical signal to be applied to a pair of drive electrical contacts from the plurality of electrical contacts, wherein each drive electrical contact of the pair of drive electrical contacts is on the symmetry of the tested material; cause a first measured voltage to be determined using a first measurement electrical contact from the plurality of electrical contacts; cause a second measured voltage to be determined using a second measurement electrical contact from the plurality of electrical contacts, and wherein the first measurement electrical contact is symmetrical to the second measurement electrical contact; and determine whether the tested material includes a crack or other defect based on a comparison between the first measured voltage and the second measured voltage.

Clause 14: The article of any one of clauses 1 to 11, wherein the controller is configured to: for each respective pair of drive electrical contacts of at least one pair of drive electrical contacts from the plurality of electrical contacts, cause a respective electrical signal to be applied to the respective pair of drive electrical contacts; for each respective pair of drive electrical contacts, cause a respective measured voltage to be determined using a respective measurement electrical contact of a plurality of measurement electrical contacts from the plurality of electrical contacts while the electrical signal is applied to the respective pair of drive electrical contacts; and determine whether the tested material includes a crack or other defect based on the respective measured voltages.

Clause 15: The article of any one of clauses 1 to 14, wherein the controller is configured to output to a user interface at least one of an audible, tactile, or visible indication of whether the tested material includes the crack or other defect.

Clause 16: A measurement system comprising an article comprising: a tested material; a first electrical connector attached to the tested material; and a plurality of electrical contacts distributed about and electrically connected to the tested material and the first electrical connector. The measurement system also comprises a measurement device comprising: a second electrical connector configured to be removably, electrically coupled to the first electrical connector; and a power source electrically connected to the second electrical connector. At least one of the article or the measurement device may include a controller configured to:

cause an electrical signal to be applied to a pair of drive electrical contacts from the plurality of electrical contacts; cause a measured voltage to be determined using a measurement electrical contact from the plurality of electrical contacts; and determine whether the tested material includes a crack or other defect based on the measured voltage.

Clause 17: The measurement system of clause 16, wherein the article comprises the controller.

Clause 18: The measurement system of clause 16, wherein the measurement device comprises the controller.

Clause 19: The measurement system of any one of clauses 16 to 18, further comprising: a programmable switch array electrically connected between the first electrical connector the plurality of electrical contacts; and an analog-to-digital converter electrically connected to the programmable switch array and the controller.

Clause 20: The measurement system of clause 19, wherein the article comprises the programmable switch array and the analog-to-digital converter.

Clause 21: The measurement system of clause 19, wherein the article comprises the programmable switch array and the measurement device comprises the analog-to-digital converter.

Clause 22: The measurement system of clause 20 or 21, wherein the pair of drive electrical contacts comprises a force electrical contact and a return electrical contact, wherein the controller is configured to control the programmable switch array to select the force electrical contact, the return electrical contact, and the measurement electrical contact, and electrically connect the measurement electrical contact to an input of the analog-to-digital converter.

Clause 23: The measurement system of clause 22, wherein the electrical signal is a current signal, and wherein the controller is configured to cause the current signal to be applied to the positive drive electrical contact.

Clause 24: The measurement system of any one of clauses 21 to 23, wherein the pair of drive electrical contacts comprises a force electrical contact and a return electrical contact, wherein the controller is configured to control the programmable switch array to select the force electrical contact, the return electrical contact, and the measurement electrical contact, and electrically connect the measurement electrical contact to an input of the analog-to-digital converter.

Clause 25: The measurement system of clause 24, wherein the electrical signal is a current signal, and wherein the controller is configured to cause the current signal to be applied to the force electrical contact.

Clause 26: The measurement system of any one of clauses 16 to 25, wherein the controller is configured to: for each respective pair of drive electrical contacts of at least one pair of drive electrical contacts from the plurality of electrical contacts, cause a respective electrical signal to be applied to the respective pair of drive electrical contacts; for each respective pair of drive electrical contacts, determine a respective measured voltage using a respective measurement electrical contact of a plurality of measurement electrical contacts from the plurality of electrical contacts while the electrical signal is applied to the respective pair of drive electrical contacts; and determine whether the tested material includes a crack or other defect based on the respective measured voltages.

Clause 27: The measurement system of any one of clauses 16 to 25, wherein the plurality of electrical contacts are arranged symmetrically on the tested material with reference to a symmetry of the tested material.

Clause 28: The measurement system of clause 27, wherein the symmetry is a point, a line, a plane, a curve, or a manifold, and wherein a single mathematical operation made with reference to the symmetry maps each electrical contact of the plurality of electrical contacts to another electrical contact of the plurality of electrical contacts.

Clause 29: The measurement system of clause 27 or 28, wherein the controller is configured to: cause the electrical signal to be applied to a pair of drive electrical contacts from the plurality of electrical contacts, wherein each drive electrical contact of the pair of drive electrical contacts is on the symmetry of the tested material; determine a first measured voltage using a first measurement electrical contact from the plurality of electrical contacts; determine a second measured voltage using a second measurement electrical contact from the plurality of electrical contacts, and wherein the first measurement electrical contact is symmetrical to the second electrical contact; and determine whether the tested material includes a crack or other defect based on a comparison between the first measured voltage and the second measured voltage.

Clause 30: The measurement system of clause 27 or 28, wherein the controller is configured to: cause a first electrical signal to be applied to a first pair of drive electrical contacts, wherein the first pair of drive electrical contacts is from the plurality of electrical contacts; while the first electrical signal is being applied to the first pair of drive electrical contacts, determine a first measured voltage using a first measurement electrical contact, wherein the first measurement electrical contact is from the plurality of electrical contacts; cause a second electrical signal to be applied to a second pair of drive electrical contacts, wherein the second pair of drive electrical contacts is from the plurality of electrical contacts, and wherein the first pair of drive electrical contacts is substantially symmetrical to the second pair of drive electrical contacts with reference to the symmetry of the material; while the second electrical signal is being applied to the second pair of drive electrical contacts, determining a second measured voltage using a second, different measurement electrical contact, wherein the second, different measurement electrical contact is from the plurality of electrical contacts and is symmetrical to the first electrical contact with reference to the symmetry of the material; and determining whether the material includes a crack or other defect based on a comparison between the first measured voltage and the second measured voltage.

Clause 31: The measurement system of any one of clauses 16 to 30, further comprising a nonvolatile memory, wherein: the nonvolatile memory device stores a control voltage; and the controller is further configured to retrieve the control voltage from the nonvolatile memory device and determine whether the tested material includes the crack or other defect based on the measured voltage and the control voltage.

Clause 32: The measurement system of claim 31, wherein the article comprises the nonvolatile memory.

Clause 33: The measurement system of clause 31, wherein the measurement device comprises the nonvolatile memory.

Clause 34: The measurement system of clause 32 or 33, wherein the controller is configured to determine whether the tested material includes a crack or other defect based on a ratio between the measured voltage and the control voltage or a difference between the measured voltage and the control voltage.

Clause 35: The measurement system of any one of clauses 16 to 34, wherein further comprising a user interface for outputting an indication of whether the tested material includes the crack or other defect.

Clause 36: The measurement system of clause 35, wherein the article comprises the user interface.

Clause 37: The measurement system of clause 35, wherein the measurement device comprises the user interface.

Clause 38: The measurement system of clause 26, wherein: the article further comprises: a data communication and control device electrically connected to the first electrical connector; a programmable switch array electrically connected to the data communication and control device and the plurality of electrical contacts; an analog-to-digital converter electrically connected to the programmable switch array and the data communication and control device; and a non-volatile memory electrically connected to the data communication and control device; the measurement system comprises the controller and further comprises: a voltage source; and a user interface.

Clause 39: A method comprising: coupling a first electrical connector of an article to a second electrical connector of a measurement device, wherein the article comprises a tested material, the first electrical connector, and a plurality of electrical contacts electrically connected to the first electrical connector, and wherein the measurement device comprises a power source and a user interface; causing, by a controller, an electrical signal to be applied to a pair of drive electrical contacts from the plurality of electrical contacts; receiving, by the controller, from an analog-to-digital converter, a measured voltage measured using a measurement electrical contact from the plurality of electrical contacts; determining, by the controller, whether the tested material includes a crack or other defect based on the measured voltage; and outputting, by the controller, to the user interface, an indication of whether the tested material includes the crack or other defect.

Clause 40: The method of clause 39, further comprising: retrieving, by the controller, control voltage from a non-volatile memory; and wherein determining whether the tested material includes the crack or other defect comprises determining, by the controller, whether the tested material includes the crack or other defect based on the measured voltage and the control voltage.

Clause 41: The method of clause 40, wherein the article comprises the non-volatile memory.

Clause 42: The method of clause 40, wherein the measurement device comprises the non-volatile memory.

Clause 43: The method of any one of clauses 40 to 42, wherein determining whether the tested material includes the crack or other defect based on the measured voltage and the control voltage comprises determining, by the controller, whether the tested material includes a crack or other defect based on a ratio between the measured voltage and the control voltage or a difference between the measured voltage and the control voltage.

Clause 44: The method of any one of clauses 39 to 43, wherein: causing the electrical signal to be applied to the pair of drive electrical contacts from the plurality of electrical contacts comprises causing a programmable switch array to select the force electrical contact and the return electrical contact from the plurality of electrical contacts; receiving, from the analog-to-digital converter, a measured voltage measured using the measurement electrical contact comprises causing the programmable switch array to select the measurement electrical contact from the plurality of electrical contacts and electrically connect the measurement electrical contact to an input of the analog-to-digital converter.

Clause 45: The method of any one of clauses 39 to 44, wherein: the plurality of electrical contacts are arranged symmetrically on the tested material with reference to a symmetry of the tested material; the symmetry is a point, a line, a plane, a curve, or a manifold, and wherein a single mathematical operation made with reference to the symmetry maps each electrical contact of the plurality of electrical contacts to another electrical contact of the plurality of electrical contacts; each drive electrical contact of the pair of drive electrical contacts is on the symmetry of the tested material; receiving, from the analog-to-digital converter, the measured voltage comprises: receiving, from the analog-to-digital converter, a first measured voltage measured using a first measurement electrical contact from the plurality of electrical contacts; receiving, from the analog-to-digital converter, a second measured voltage measured using a second measurement electrical contact from the plurality of electrical contacts, and wherein the first electrical contact is symmetrical to the second measurement electrical contact; and determining whether the tested material includes the crack or other defect comprises determining whether the tested material includes the crack or other defect based on a comparison between the first measured voltage and the second measured voltage.

Clause 46: The method of any one of clauses 39 to 44, wherein: the plurality of electrical contacts are arranged symmetrically on the tested material with reference to a symmetry of the tested material; the symmetry is a point, a line, a plane, a curve, or a manifold, and wherein a single mathematical operation made with reference to the symmetry maps each electrical contact of the plurality of electrical contacts to another electrical contact of the plurality of electrical contacts; causing the electrical signal to be applied to the pair of drive electrical contacts from the plurality of electrical contacts comprises causing a first electrical signal to be applied to a first pair of drive electrical contacts from the plurality of electrical contacts; receiving, from the analog-to-digital converter, the measured voltage measured using the measurement electrical contact from the plurality of electrical contacts comprises receiving, from the analog-to-digital converter, a first measured voltage measured using a first measurement electrical contact from the plurality of electrical contacts; the method further comprises: causing a second electrical signal to be applied to a second pair of drive electrical contacts from the plurality of electrical contacts; and receiving, from the analog-to-digital converter, a second measured voltage measured using a second measurement electrical contact from the plurality of electrical contacts; the first pair of drive electrical contacts is substantially symmetrical to the second pair of drive electrical contacts with reference to the symmetry of the material the second, different measurement electrical contact is symmetrical to the first electrical contact with reference to the symmetry of the material; and determining whether the tested material includes the crack or other defect comprises determining whether the material includes a crack or other defect based on a comparison between the first measured voltage and the second measured voltage.

Clause 47: The method of any one of clauses 39 to 46, wherein: the article further comprises: a data communication and control device electrically connected to the first electrical connector; a programmable switch array electrically connected to the data communication and control device and the plurality of electrical contacts; the analog-to-digital converter electrically connected to the programmable switch array and the data communication and control device; and a non-volatile memory electrically connected to the data communication and control device; the measurement system comprises the controller and further comprises: a voltage source; and a user interface.

EXAMPLES

Example 1

Figure 10:
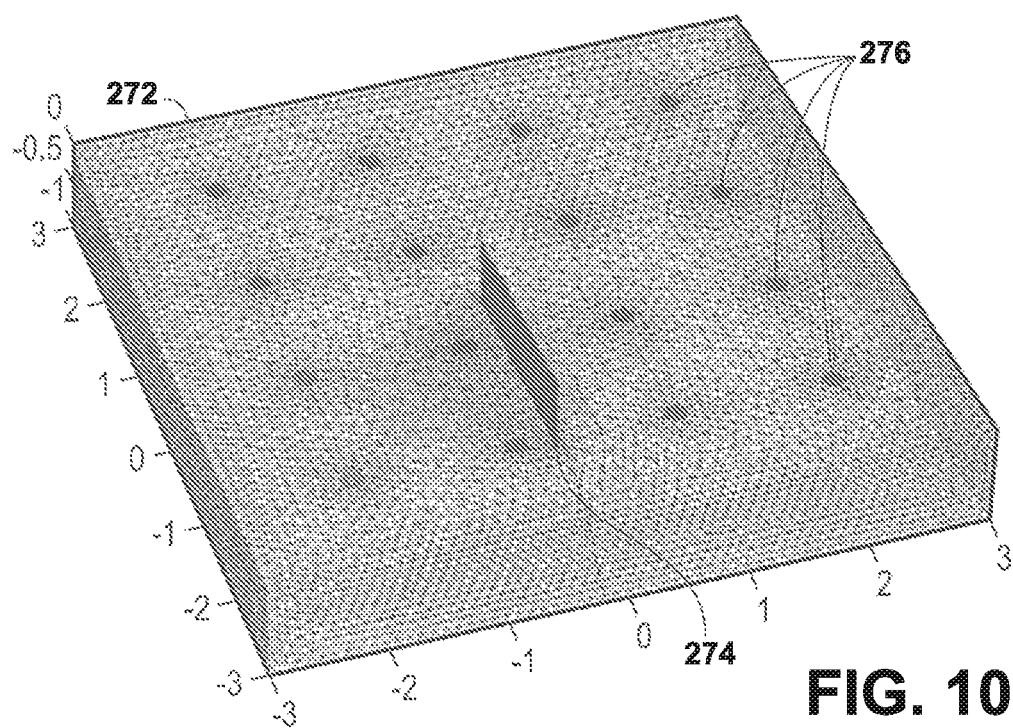
FIG. 10 is a diagram illustrating an example finite element model of a material that includes a simulated crack or other defect.

FIG. 10 is a diagram illustrating an example fine-grained FEM of a material 272 that includes a simulated crack or other defect. The fine-grained FEM includes a thin 'crack' feature 274 of low conductivity (compared to the rest of the sample) buried below the top surface of the sample and almost touching the bottom. FIG. 10 also illustrates a set of sixteen electrical contacts 276 distributed around the upper surface of material 272 (four of which are labeled in FIG. 10). A forward solution of electrical conductivity using this fine-grained FEM was used to generate the measured voltages for the cracked material. A forward solution of the same fine-grained FEM, but excluding the thin 'crack' feature 274 was used to generate the control voltages.

A coarse-grained FEM, having a coarser mesh than the fine-grained FEM, was used to reconstruct the fine-grained FEM including the crack. The electrical contact placement and geometry of the coarse-grained FEM was the same as in the fine-grained FEM. The algorithm inv_solve_diff_GN_one_step in the package Electrical Impedance Tomography and Diffuse Optical Tomography Reconstruction Software (EIDORS) was used to solve the reconstruction problem in MATLAB®. MATLAB® is available from MathWorks®, Inc., Natick, Mass., United States. EIDORS is available at eidors3d.sourceforge.net. An L-Curve method of hyperparameter selection and a Laplace filter penalty function was utilized in the EIDORS package.

Figure 11:
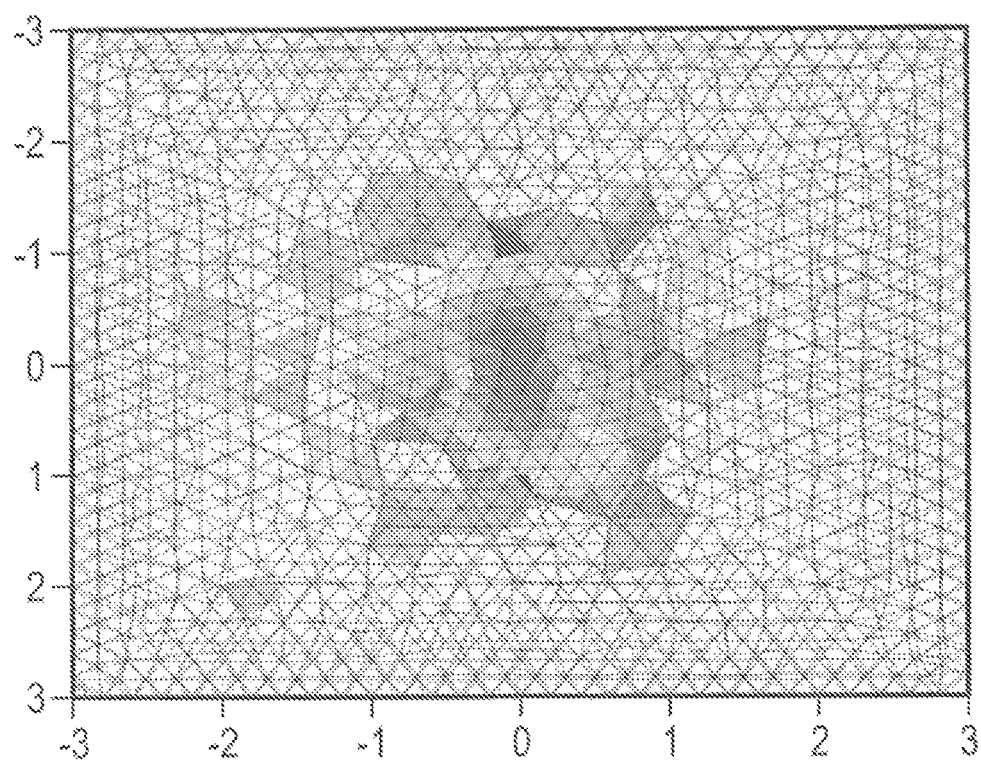
FIG. 11 is a diagram illustrating an example grayscale model output overlaid on an example finite element model of a material that includes a simulated crack or other defect.
Figure 12:
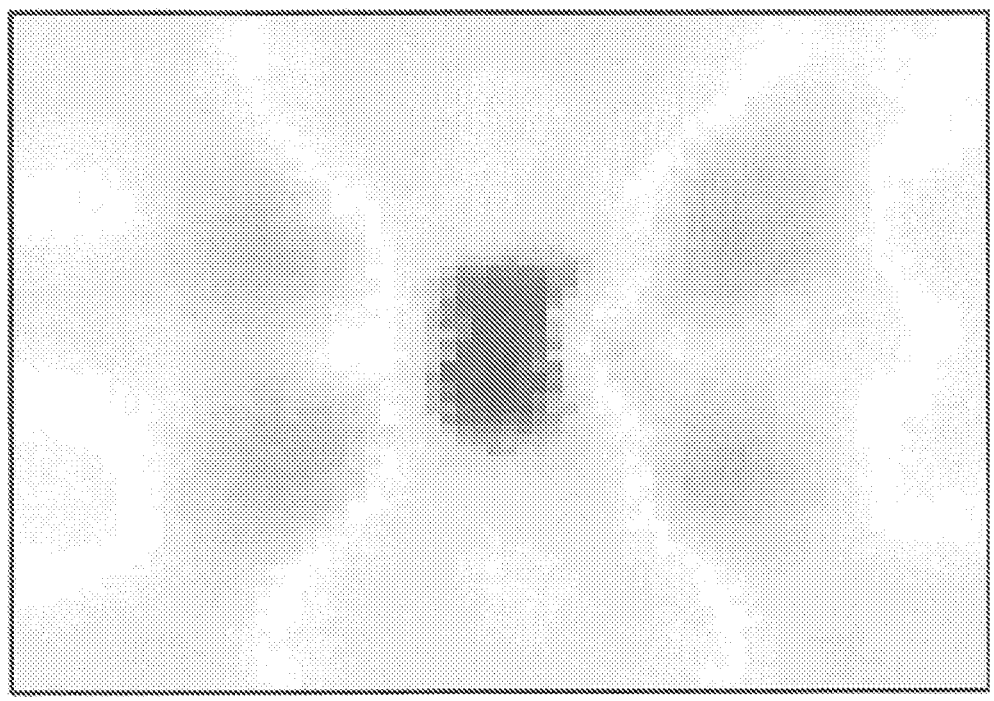
FIG. 12 is a diagram illustrating an example grayscale output of a finite element model of a material that includes a simulated crack or other defect.

FIG. 11 is a diagram illustrating an example grayscale model output overlaid on an example finite element model of a material that includes a simulated crack or other defect. The image shown in FIG. 11 is an output of the coarse-grained FEM with the physics-based model after solving the regularized least-squares minimization problem. The image shown in FIG. 11 is shown looking up at the bottom of the model. The defect is clearly detected in the sample in the center of the image. Cross-sectional images can be taken at any location within the model. FIG. 12 is a cross-sectional diagram illustrating an example grayscale output of a FEM that includes a simulated crack or other defect. This example utilized only one iteration of the Gauss-Newton algorithm and exhibits some noise surrounding the simulated crack. These artifacts can be reduced by running multiple iterations to refine the solution further (at the cost of computation time, for example between 2 and 20 iterations could be used).

Example 2

Figure 13:
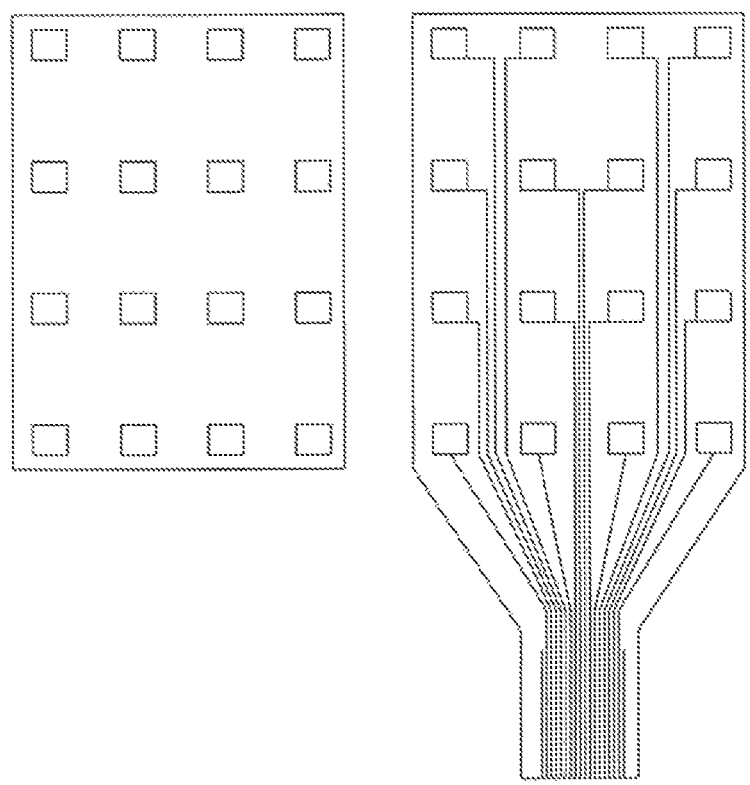
FIG. 13 is a drawing illustrating an example ceramic sample including a sixteen-element electrical contact array and a flex circuit.
Figure 14:
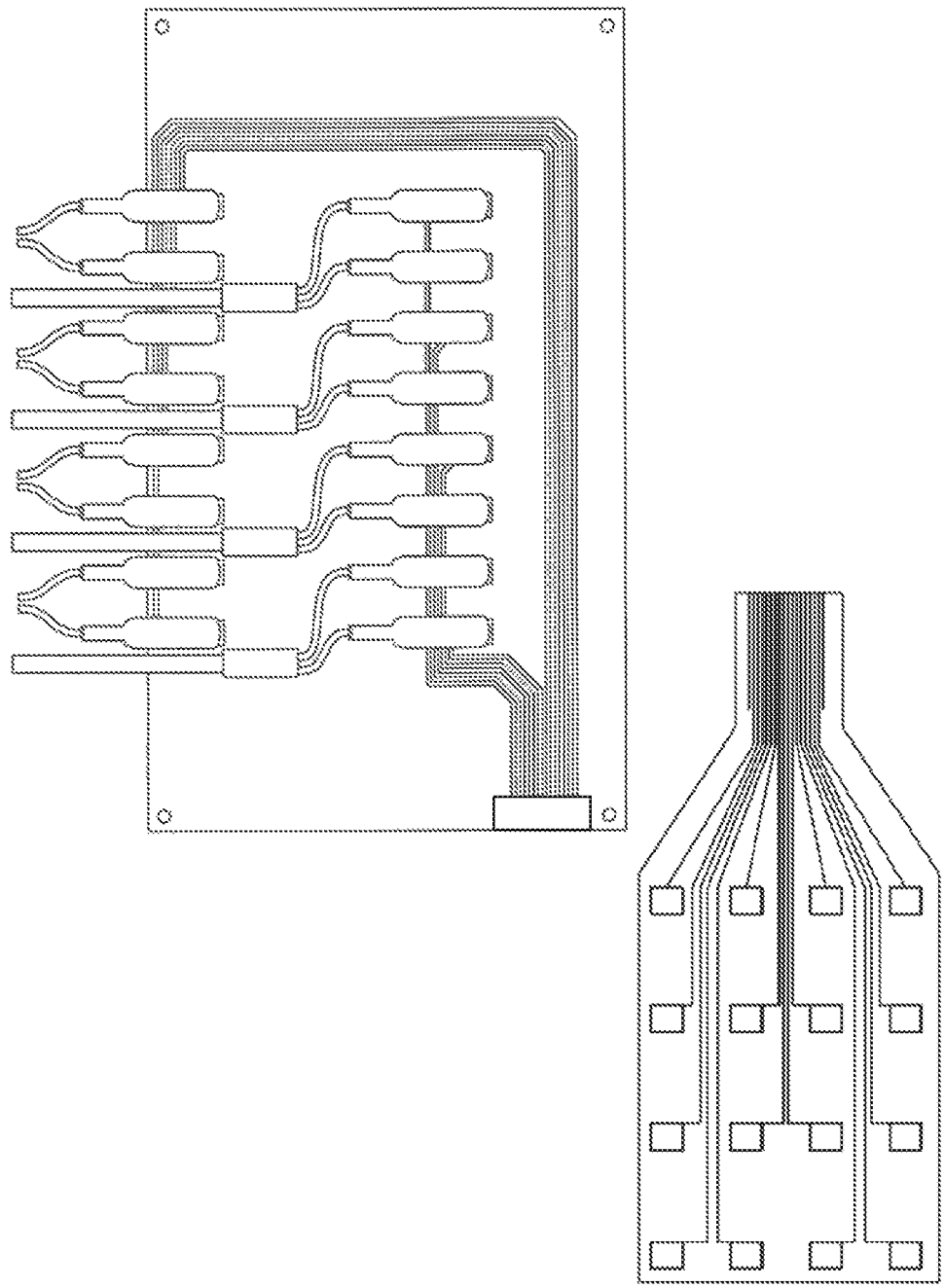
FIG. 14 is a drawing illustrating the example ceramic sample of FIG. 13 attached to a flex circuit, a breakout board, and a set of leads.

A ceramic sample included approximately 70% boron carbide and 30% silicon carbide. The back side of the ceramic sample was coated with a fiberglass/epoxy resin to keep the pieces in intimate contact after breaking. On the front side, sixteen approximately square electrical contacts were vapor deposited through a shadow mask. The electrical contacts included a first layer of titanium with a thickness of about 5 nanometers (nm) and a second layer of gold with a thickness of about 100 nm. A flex circuit was etched to match the locations of the electrical contacts, and a conductive silver-loaded epoxy was used to make electrical connections between the flex circuit and gold contacts. The flex circuit then was connected to a breakout board, which was connected to the switch matrixes. After the conductive epoxy was cured and the flex circuit attached to the electrical contacts, the ceramic sample was wrapped in tape to help further contain any pieces after breaking. FIG. 13 is a drawing illustrating the ceramic sample including the sixteen element electrical contact array and the flex circuit. FIG. 14 is a drawing illustrating an example ceramic material attached to a flex circuit, a breakout board, and a set of leads.

AC currents of 10 mA were applied to pairs of electrical contacts. Electrical contacts were numbered 1-16 and drive pairs were six electrical contacts apart (e.g. 1 and 7, 2 and 9, etc.) using modulo 16 math. Measurement pairs were adjacent (e.g. 1 and 2) again modulo 16. For each drive pair, all possible measurements were taken according to the following rule: the measurement pairs may not contain either drive electrical contact. Frequencies of 50 kHz, 100 kHz, and 150 kHz were used.

Figure 15:
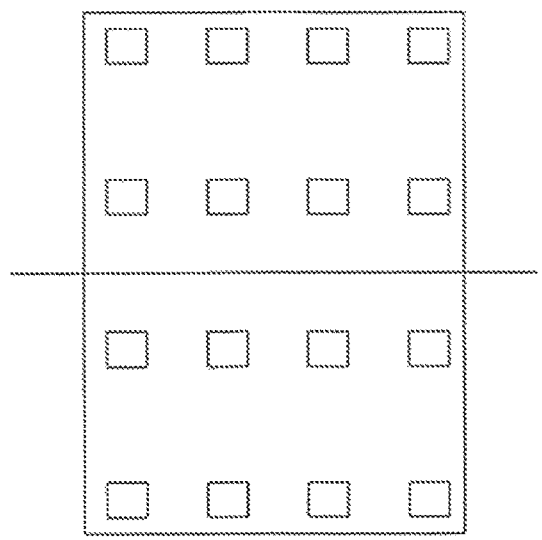
FIG. 15 is a drawing illustrating the example ceramic sample of FIG. 13 including an electrical contact array and a location of a crack.

A control dataset was taken prior to breaking the ceramic sample. After the initial dataset was taken, the sample was hit in approximately the center with a hammer, resulting in a crack located through the middle of the ceramic sample. FIG. 15 is a drawing illustrating the ceramic sample including an electrical contact array and the location of a crack. FIG. 15 illustrates the location of the crack as the horizontal line through the approximate center of the ceramic sample.

After breaking, a measurement data set was collected according to the rules described above. The control dataset and measurement data set were analyzed using electrical impedance tomography image reconstruction algorithms. In particular, the algorithm inv_solve_diff_GN_one_step in the package EIDORS was used to determine the approximate impedance change within the sample. MATLAB® is available from MathWorks®, Inc., Natick, Mass., United States. EIDORS is available at eidors3d.sourceforge.net. An L-Curve method of hyperparameter selection and a Laplace filter penalty function was utilized in the EIDORS package.

Figure 16:
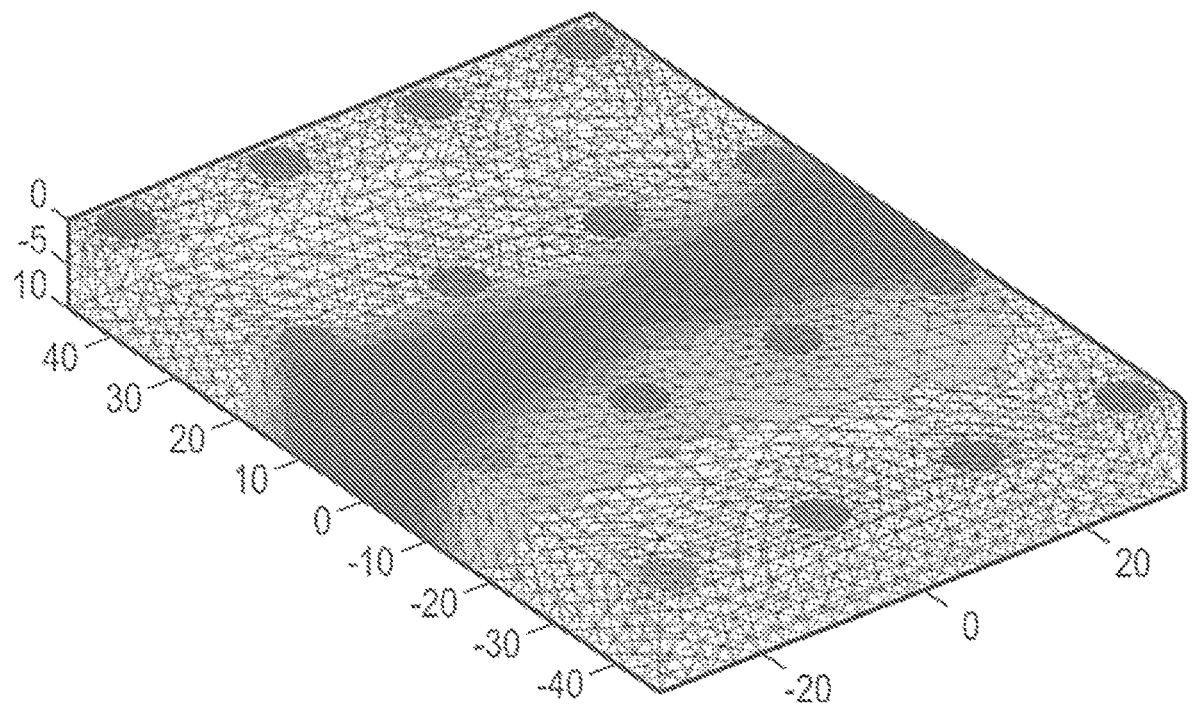
FIG. 16 is a diagram illustrating an example grayscale output of the EIDORS algorithm for the example ceramic sample of FIG. 15.

FIG. 16 is a diagram illustrating an example grayscale output of the EIDORS algorithm for the example ceramic sample of FIG. 15. The crack creates a region of higher resistance, and this is shown in the figure below as a drop in conductivity (darker shading indicates lower conductivity than the initial dataset).

Various examples have been described. These and other examples are within the scope of the following claims.

What is claimed is:

1. An article comprising:
   a tested material;
   a plurality of electrical contacts distributed about a perimeter of the tested material and electrically connected to the perimeter of the tested material;
   a nonvolatile memory device configured to store a control voltage, the nonvolatile memory being physically attached to the tested material;
   a programmable switch array electrically connected to the plurality of electrical contacts via a plurality of electrical connections;
   a voltage source electrically connected the plurality of electrical contacts; and
   a controller electrically coupled to the programmable switch array, wherein the controller is configured to:
      control the programmable switch array to designate a pair of drive electrical contacts from the plurality of electrical contacts comprising, such that all remaining electrical contacts of the plurality of electrical contacts not included in the pair of drive electrical contacts are measurement electrical contacts;

cause the voltage source to apply an electrical signal to the tested material via the pair of drive electrical contacts;

determine a plurality of measured voltages at the measurement electrical contacts in response to the electrical signal applied to the tested material via the pair of drive electrical contacts;

retrieve the control voltage from the nonvolatile memory device; and determine whether the tested material includes a defect based on respective ratios between the control voltage and each respective measurement voltage of the plurality of measurement voltages.

2. The article of claim 1, wherein the voltage source comprises a photovoltaic cell.

3. The article of claim 1, further comprising an analog-to-digital converter (ADC) configured to convert analog signals received from the measurement electrical contacts to a digital format, wherein the ADC is electrically connected to the programmable switch array and the controller, and wherein the controller is further configured to control the programmable switch array to select a force electrical contact and a return electrical contact from the pair of drive electrical contacts.

4. The article of claim 1, wherein the pair of drive electrical contacts is a first pair of drive electrical contacts of a plurality of pairs of drive electrical contacts designated by the programmable switch array among the plurality of electrical contacts, and wherein the controller is further configured to cause the voltage source to apply a respective electrical signal via each respective pair of drive electrical contacts of the plurality of pairs of drive electrical contacts to the tested material.

5. The article of claim 1, further comprising a user interface device communicatively coupled to the controller, wherein the controller is configured to output, via the user interface device, at least one of an audible, tactile, or visible indication of the determination of whether the tested material includes the defect.

6. A measurement system comprising:
an article comprising:
a tested material;
a first electrical connector attached to a perimeter of the tested material;
a plurality of electrical contacts distributed about the perimeter of the tested material and electrically connected to the tested material and to the first electrical connector; and
a programmable switch array electrically connected between the first electrical connector the plurality of electrical contacts;
a nonvolatile memory device configured to store a control voltage; and
a measurement device comprising:
a second electrical connector configured to be removably and electrically coupled to the first electrical connector; and
a power source electrically connected to the second electrical connector, wherein at least one of the article or the measurement device comprises a controller configured to:

control the programmable switch array to designate a pair of drive electrical contacts from the plurality of electrical contacts comprising, such that all remaining electrical contacts of the plurality of electrical contacts not included in the pair of drive electrical contacts are measurement electrical contacts;

cause the power source to apply an electrical signal to the tested material via the pair of drive electrical contacts;

determine a plurality of measured voltages at the measurement electrical contacts in response to the electrical signal applied to the tested material via the pair of drive electrical contacts; and determine whether the tested material includes a defect based on respective ratios between the control voltage and each respective measured voltage of the plurality of measurement voltages.

7. The measurement system of claim 6, further comprising an analog-to-digital converter electrically connected to the programmable switch array and the controller, the analog-to-digital converter being configured to convert analog signals received from the measurement electrical contacts to a digital format.

8. The measurement system of claim 7, wherein controller is further configured to control the programmable switch array to select a force electrical contact and a return electrical contact from the pair of drive electrical contacts, and wherein the programmable switch array and the analog-to-digital converter are included in the article.

9. The measurement system of claim 7, wherein the programmable switch array is included in the article, wherein the analog-to-digital converter is included in the measurement device, and wherein the controller is further configured to control the programmable switch array to select a force electrical contact and a return electrical contact from the pair of drive electrical contacts.

10. The measurement system of claim 6, wherein the for each respective pair of drive electrical contacts is a first pair of drive electrical contacts of a plurality of pairs of drive electrical contacts designated by the programmable switch array among the plurality of electrical contacts, and wherein the controller is further configured to cause the power source to apply a respective electrical signal via each respective pair of drive electrical contacts of the plurality of pairs of drive electrical contacts to
the tested material.

11. The measurement system of claim 6, wherein the plurality of electrical contacts are arranged symmetrically about the perimeter of the tested material with reference to a symmetry of the tested material.

12. The measurement system of claim 11, wherein the electrical signal is a first electrical signal, wherein the pair of drive electrical contacts is a first pair of electrical contacts, wherein the plurality of measured voltages is a first plurality of measured voltages, and wherein the controller is further configured to control the programmable switch array to select a second pair of drive electrical contacts from the plurality of electrical contacts;

cause a second pair of drive electrical contacts to apply a second electrical signal to the tested material, wherein the first pair of drive electrical contacts and the second pair of drive electrical contacts are positioned substantially symmetrically with reference to the symmetry of the tested material; and in response to the second electrical signal being applied via the second pair of drive electrical contacts, determine a second plurality of measured voltages at the measurement electrical contacts, wherein to determine whether the tested material includes the defect, the controller is further configured to compare the first measured voltage to the second measured voltage.

13. The measurement system of claim 6, further comprising a user interface device for outputting an indication of whether the tested material includes the defect.

14. The measurement system of claim 10, wherein the article further comprises:

a data communication and control device electrically connected to the first electrical connector; and a non-volatile memory electrically connected to the data communication and control device, and wherein the measurement system a user interface device communicatively coupled to the controller.

15. The article of claim 1, wherein the defect comprises a crack in the tested material.

16. The article of claim 1, wherein to determine whether the tested material includes the defect based on the respective ratios, the controller is configured to determine whether the tested material includes the defect based on a weighted average of all of the respective ratios.

17. The article of claim 1, wherein the tested material comprises one or more of an electrically conductive ceramic or a semiconductive ceramic.

18. The article of claim 1, wherein the tested material comprises one or more of boron carbide, silicon carbide, or alumina.

* * * * *

UNITED STATES PATENT AND TRADEMARK OFFICE
CERTIFICATE OF CORRECTION

PATENT NO.         : 11,112,374 B2
APPLICATION NO.    : 16/469900
DATED              : September 7, 2021
INVENTOR(S)        : Yungers et al.

It is certified that error appears in the above-identified patent and that said Letters Patent is hereby corrected as shown below:

In the Claims

Column 34
Line 61, In Claim 1, after "connected", insert -- to --.

Column 35
Line 56, In Claim 6, after "electrical connector", insert -- and --.

Column 36
Line 27, In Claim 8, before "connector", insert -- the --.
Line 42, In Claim 10, before "pair of drive", delete "for each respective".
Line 65, In Claim 12, delete "a second pair" and insert -- the second pair --, therefor.

Column 38
Line 3, In Claim 14, after "system", insert -- comprises --.

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*